(12) United States Patent
Miller et al.

(10) Patent No.: US 12,416,261 B2
(45) Date of Patent: Sep. 16, 2025

(54) GAS TURBINE ENGINE

(71) Applicant: General Electric Company, Schenectady, NY (US)

(72) Inventors: Brandon Wayne Miller, Liberty Township, OH (US); Andrew Hudecki, Milford, OH (US); Steven Douglas Johnson, Milford, OH (US); Eric Barre, Cincinnati, OH (US); John Carl Glessner, Kings Mills, OH (US); Efren Souza Chavez, Queretaro (MX)

(73) Assignee: General Electric Company, Evendale, OH (US)

( * ) Notice: Subject to any disclaimer, the term of this patent is extended or adjusted under 35 U.S.C. 154(b) by 3 days.

(21) Appl. No.: 18/071,722

(22) Filed: Nov. 30, 2022

(65) Prior Publication Data
US 2024/0110515 A1 Apr. 4, 2024

Related U.S. Application Data

(60) Provisional application No. 63/411,180, filed on Sep. 29, 2022.

(51) Int. Cl.
*F02C 7/18* (2006.01)
*F01D 25/12* (2006.01)
*F02C 6/08* (2006.01)

(52) U.S. Cl.
CPC .............. *F02C 6/08* (2013.01); *F01D 25/12* (2013.01); *F02C 7/18* (2013.01); *F05D 2220/323* (2013.01); *F05D 2260/232* (2013.01)

(58) Field of Classification Search
CPC .................. F02C 6/08; F01D 25/12
See application file for complete search history.

(56) References Cited

U.S. PATENT DOCUMENTS

| | | | |
|---|---|---|---|
| 3,638,428 | A | 2/1972 | Shipley et al. |
| 4,698,964 | A | 10/1987 | Glancy |
| 5,269,135 | A | 12/1993 | Vermejan et al. |
| 5,279,109 | A | 1/1994 | Liu et al. |
| 7,966,831 | B2 | 6/2011 | Kraft et al. |
| 9,127,598 | B2 | 9/2015 | Snook et al. |
| 9,623,354 | B2 | 4/2017 | Kumar et al. |
| 9,982,598 | B2 | 5/2018 | Pritchard, Jr. et al. |
| 10,107,200 | B2 | 10/2018 | Miller et al. |
| 10,208,676 | B2 | 2/2019 | Johnson et al. |
| 10,287,992 | B2 | 5/2019 | Tan et al. |

(Continued)

*Primary Examiner* — Brian P Wolcott
*Assistant Examiner* — John S Hunter, Jr.
(74) *Attorney, Agent, or Firm* — Dority & Manning, P.A.

(57) ABSTRACT

A gas turbine engine including: a fan assembly comprising a fan; and a turbomachine drivingly coupled to the fan and including a compressor section, a combustion section, and a turbine section arranged in serial flow order and defining in part a working gas flowpath, the gas turbine engine defining a bypass passage over the turbomachine; the turbomachine further including a heat exchanger and defining an annular cooling passage extending between an inlet and an outlet, the inlet in airflow communication with the working gas flowpath at a location upstream of the compressor section and the outlet in airflow communication with the bypass passage, the heat exchanger in thermal communication with an airflow through the cooling passage.

19 Claims, 14 Drawing Sheets

(56) References Cited

U.S. PATENT DOCUMENTS

| | | | |
|---|---|---|---|
| 10,494,949 B2 * | 12/2019 | Rambo | F01D 25/14 |
| 10,590,856 B2 | 3/2020 | Howarth | |
| 10,794,281 B2 | 10/2020 | Nestico et al. | |
| 10,794,288 B2 | 10/2020 | Schwarz et al. | |
| 10,830,179 B2 | 11/2020 | Hatim | |
| 10,934,939 B2 | 3/2021 | Miller et al. | |
| 12,044,194 B2 * | 7/2024 | Ostdiek | F02C 3/067 |
| 2021/0108597 A1 * | 4/2021 | Ostdiek | F02K 1/34 |
| 2021/0269168 A1 | 9/2021 | Shaner et al. | |

* cited by examiner

GAS TURBINE ENGINE

CROSS-REFERENCE TO RELATED APPLICATIONS

This application is a non-provisional application claiming the benefit of priority under 35 U.S.C. § 119(e) to U.S. Provisional Application No. 63/411,180, filed Sep. 29, 2022, which is hereby incorporated by reference in its entirety.

FIELD

The present disclosure relates to a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly, and the fan assembly may be enclosed by an outer nacelle. The outer nacelle may define a bypass passage with the turbomachine.

Generally, improvements to a turbofan engine in the fields of thermal management and aerodynamics would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
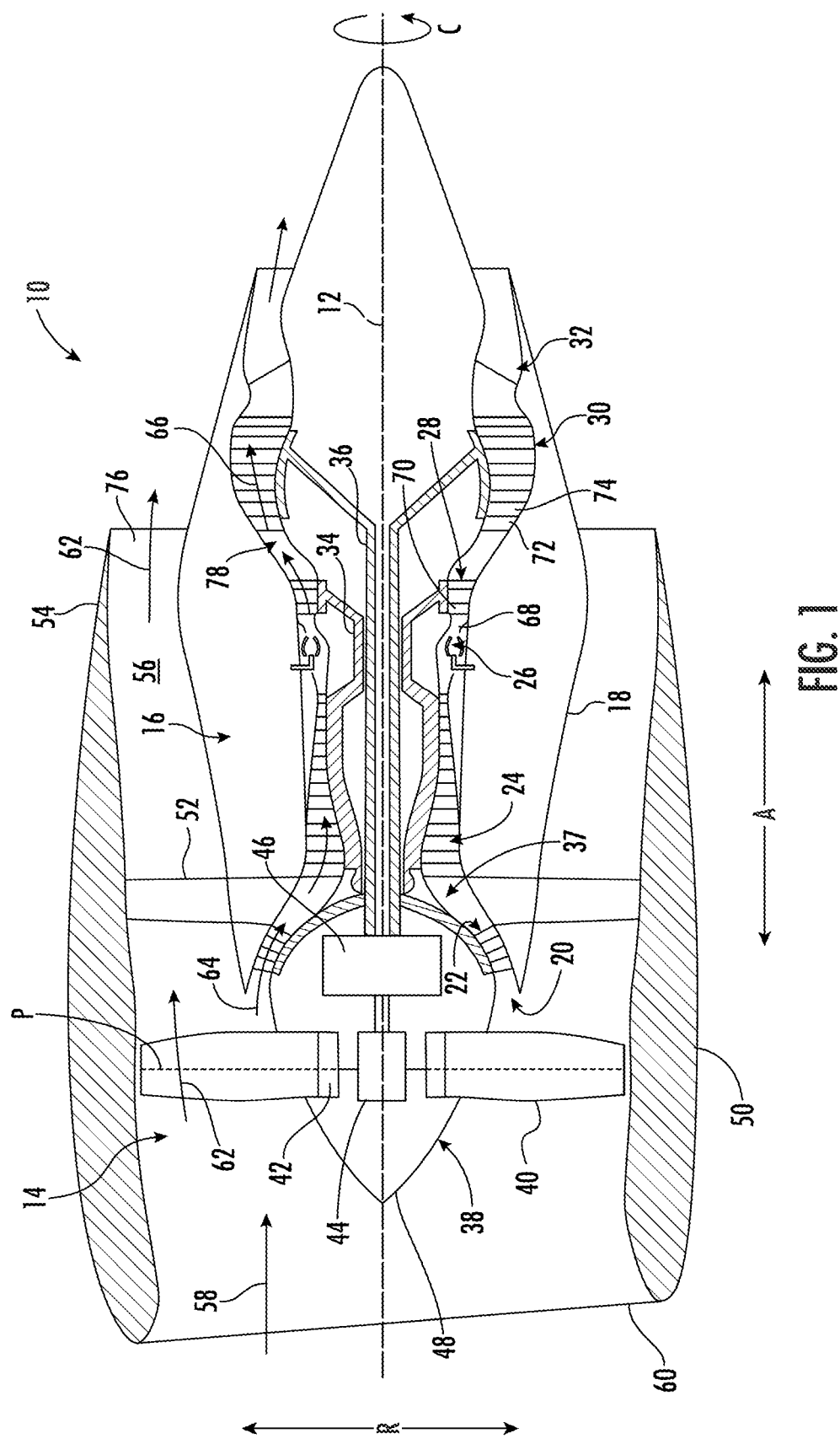
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., –er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "first", "second", and "third" may be used interchangeably to distinguish one component from another and are not intended to signify location or importance of the individual components.

The present disclosure is generally related to a gas turbine engine, such as a turbofan engine.

As design criteria for turbofan engines drives operating conditions to higher pressures and temperatures, it has been recognized that increased cooling capacity would be welcomed in the art. Certain gas turbine engines bleed air from, e.g., a high pressure compressor, and use the bleed air to cool various accessory systems of the turbofan engine. However, such a configuration may result in inefficiencies as the air bled from the high pressure compressor undergoes a relatively high amount of work, and further is generally at an elevated temperature.

Accordingly, in one exemplary aspect, a gas turbine engine is provided having a turbomachine that defines a cooling passage extending between an inlet and an outlet, the inlet in airflow communication with a working gas flowpath of the turbomachine at a location upstream of a compressor section and the outlet in airflow communication with a bypass passage. A heat exchanger is provided in thermal communication with an airflow through the cooling passage. The heat exchanger may be utilized to cool one or more accessory systems of the gas turbine engine.

In such an exemplary aspect, the airflow provided to the heat exchanger may be relatively cool and may be provided from a location upstream of a significant amount of compression (which would result in lost work).

In another exemplary aspect of the present disclosure, a means is provided for urging an airflow through a cooling passage, such as the cooling passage discussed above. In particular, with one exemplary aspect of the present disclosure, a turbomachine of a gas turbine engine is provided, having a variable bleed assembly with a variable bleed duct extending between a variable bleed (VB) inlet and a VB outlet. The VB inlet is in airflow communication with the working gas flowpath at a location downstream of a cooling passage inlet of a cooling passage, and the VB outlet in airflow communication with the cooling passage for urging an airflow through the annular cooling passage.

In such a manner, a small amount of high pressure airflow may be utilized to urge a low pressure airflow through the cooling passage. Such may allow for the low pressure airflow to be used for cooling various components of the turbomachine, which may result in an overall more efficient cooling system and gas turbine engine.

Further, in certain exemplary aspects, an amount of the airflow from the variable bleed assembly may be controlled based on a condition of the engine, such that the cooling passage may have a variable cooling capacity based on a cooling need of the turbomachine.

Moreover, it will be appreciated that in still other exemplary aspects, a gas turbine engine having a turbomachine and a fan assembly, with the turbomachine driving the fan assembly across a reduction gearbox. Inclusion of the reduction gearbox may allow for the driving turbine to operate at higher speeds while maintaining a low fan pressure ratio, allowing for an overall length of the turbomachine to be reduced. In certain exemplary embodiments, the gas turbine engine may further include a thrust reverser assembly and a variable bleed assembly. The variable bleed assembly typically pulls an airflow from a working gas flowpath of the turbomachine between an LP compressor and an HP compressor, and extracts the airflow radially outward through a compressor mid-frame. The thrust reverser assembly may include an inner thrust reverser support member attached to an aft portion of the compressor mid-frame to allow the variable bleed assembly to exhaust in such a manner (and without risking a high pressure airflow getting beneath the inner thrust reverser support member and pushing it outward along a radial direction.

However, with such a configuration, the inner thrust reverser support member may limit how short the turbomachine may be to allow for a desired aerodynamic line. Accordingly, in one aspect of the present disclosure, the inner thrust reverser support member may be moved forward to attach to a forward end of the compressor mid-frame, allowing the turbomachine to be shortened without compromising the aerodynamic lines. Various features may be provided to accommodate integration of the inner thrust reverser support member with the variable bleed assembly to avoid the issues noted above.

In certain exemplary aspects the embodiments discussed above may be provided as stand-a-lone embodiments, or may be combined in any suitable manner. For example, the integration of the inner thrust reverser support member with the variable bleed assembly may be a stand-a-lone embodiment, or it may be integrated with the cooling passage discussed above to provide even further benefits as will be described below.

Referring now to the drawings, wherein identical numerals indicate the same elements throughout the figures, FIG. 1 is a schematic cross-sectional view of a gas turbine engine 10 in accordance with an exemplary embodiment of the present disclosure. More particularly, for the embodiment of FIG. 1, the gas turbine engine 10 is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14, the turbomachine 16 drivingly coupled to a fan 38 of the fan section 14.

The exemplary turbomachine 16 depicted generally includes a substantially tubular outer casing 18 that defines an annular turbomachine inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37. In such a manner, it will be appreciated that the turbomachine inlet 20 is an inlet to the working gas flowpath 37.

In the embodiment shown, the turbomachine inlet 20 is positioned immediately downstream of the fan 38 (i.e., no intervening structure, such as blades, vanes, or struts, therebetween). Further, it will be appreciated that for the embodiment depicted, the LP compressor 22 is located downstream of the fan 38, and there are no intermediate stages of compression between the fan 38 and the LP compressor 22.

For the embodiment depicted, the fan section 14 includes a fan 38 having a plurality of fan blades 40 coupled to a disk 42 in a spaced apart manner. As depicted, the fan 38 is a single stage fan and the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a reduction gearbox 46, and the fan blades 40, disk 42, and pitch change mechanism 44 are together rotatable about the longitudinal centerline 12 by LP shaft 36 across the reduction gearbox 46. The reduction gearbox 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by a rotatable front hub 48 of the fan section 14 (sometimes also referred to as a "spinner"). The front hub 48 is aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the outer nacelle 50 is supported relative to the turbomachine 16 by a plurality of circumferentially-spaced outlet guide vanes 52 in the embodiment depicted. Moreover, a downstream section 54 of the outer nacelle 50 extends over an outer portion of the turbomachine 16 so as to define a bypass passage 56 therebetween. The bypass passage 56 is defined at least partially over the turbomachine 16.

During operation of the gas turbine engine 10, a volume of air 58 enters the gas turbine engine 10 through an associated inlet 60 of the outer nacelle 50 and fan section 14. As the volume of air 58 passes across the fan blades 40, a first portion of air 62 is directed or routed into the bypass passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from the outer casing 18). Additionally, or alternatively, although the gas turbine engine 10 depicted is configured as a geared gas turbine engine (i.e., including the reduction gearbox 46) and a variable pitch gas turbine engine (i.e., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
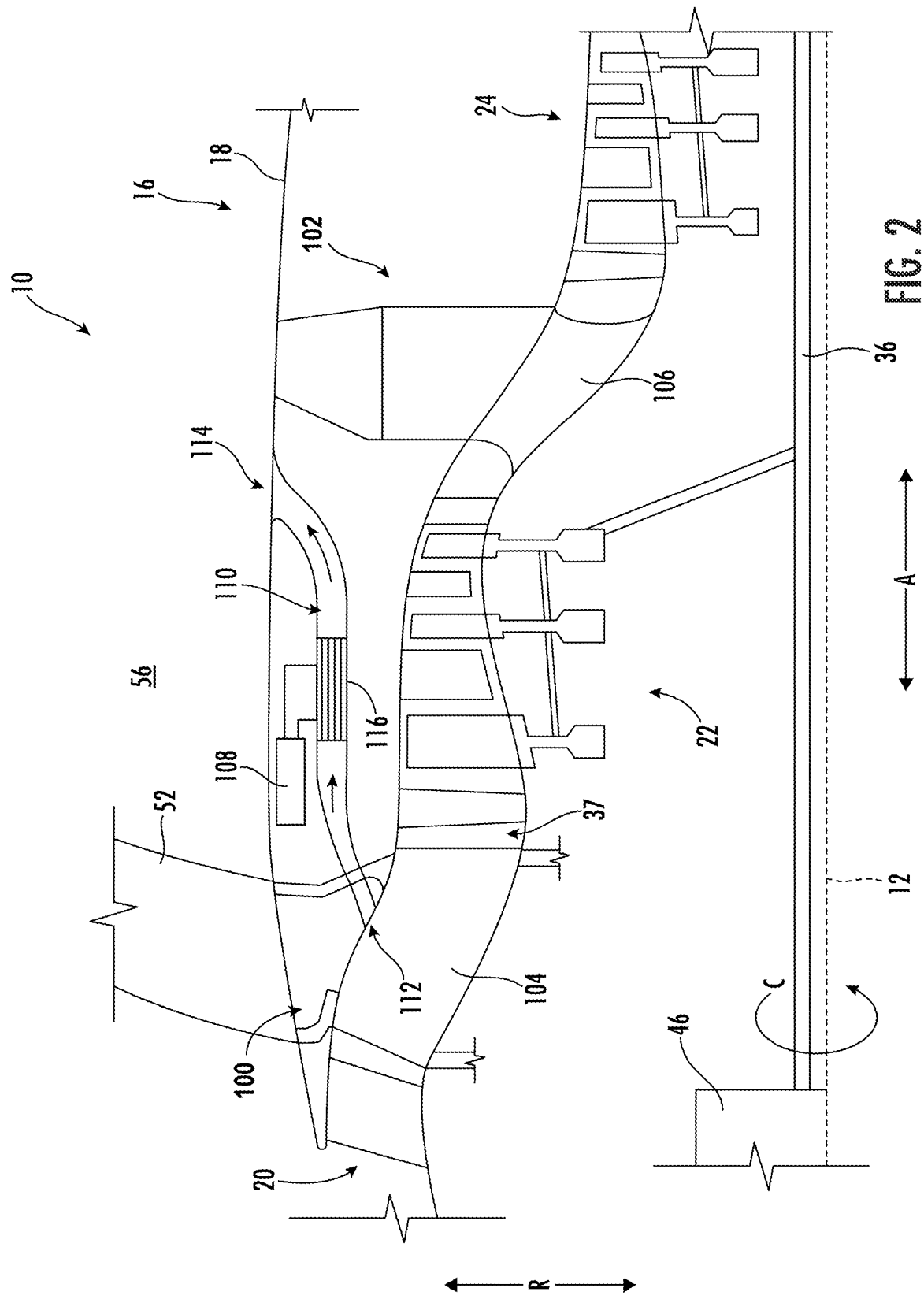
FIG. 2 is a schematic view of a portion of a turbomachine in accordance with an exemplary embodiment of the present disclosure.

Referring now to FIG. 2, a close-up, schematic view is depicted of a portion of the exemplary gas turbine engine 10 of FIG. 1. In particular, the view of FIG. 2 is a close-up of the turbomachine 16 of FIG. 1, depicting the turbomachine inlet 20, the compressor section including the LP compressor 22 and the HP compressor 24, the LP shaft 36, and the reduction gearbox 46. Further, the outer casing 18 of the turbomachine 16 is depicted extending around at least a portion of the compressor section, with the bypass passage 56 defined in part thereby.

As will be appreciated from the view of FIG. 2, the turbomachine 16 further includes a compressor forward frame 100 and a compressor mid-frame 102. The compressor forward frame 100 includes a strut 104 extending through the working gas flowpath 37 at a location upstream of the LP compressor 22 and downstream of the turbomachine inlet 20. Similarly, the compressor mid-frame 102 includes a strut 106 extending through the working gas flowpath 37 at a location downstream of the LP compressor 22 and upstream of the HP compressor 24. The compressor forward frame 100 and the compressor mid-frame 102 may provide structural support to various components of the gas turbine engine 10.

As will be appreciated, the exemplary gas turbine engine 10 depicted includes one or more accessory systems 108 for facilitating operations of the gas turbine engine 10. The one or more accessory systems 108 may include one or more of an oil lubrication system, a fuel delivery system, a cooled cooling air (CCA) system, an engine controller cooling system, etc. A single accessory system 108 is depicted schematically in FIG. 2 by way of example.

Moreover, in order to assist with cooling the one or more accessory systems 108, such as the accessory system 108 depicted, the turbomachine 16 further defines an annular cooling passage 110 extending between a cooling passage (CP) inlet 112 and a CP outlet 114.

The CP inlet 112 is in airflow communication with the working gas flowpath 37 at a location upstream of the compressor section of the turbomachine 16. More specifically, for the embodiment depicted, the CP inlet 112 is in airflow communication with the working gas flowpath 37 at a location upstream of the LP compressor 22 and downstream of the turbomachine inlet 20. More specifically, still, for the embodiment shown, the CP inlet 112 is aligned with the compressor forward frame 100 along the axial direction A of the gas turbine engine 10. In such a manner, the CP inlet 112 is configured to receive an airflow from the working gas flowpath 37 that is been compressed by the fan 38 of the fan section 14 (see FIG. 1). For example, a pressure of an airflow received through the CP inlet 112 and provided to the cooling passage 110 may be substantially equal (e.g., within 10% of) to a pressure of the airflow provided through the turbomachine inlet 20.

Referring still to FIG. 2, the CP outlet 114 is in airflow communication with the bypass passage 56. In particular, for the embodiment shown, the CP outlet 114 is in airflow communication with the bypass passage 56 at a location aft of the CP inlet 112 and forward of the compressor mid-frame 102. In particular, for the embodiment shown, the CP outlet 114 is aligned with the compressor section along the axial direction A.

Further, the turbomachine 16 includes a heat exchanger 116 that is in thermal communication with the airflow through the cooling passage 110. In particular, the heat exchanger 116 is positioned within the cooling passage 110 or defines a portion of the cooling passage 110. In such a manner, the heat exchanger 116 may be configured to transfer heat from a fluid to the airflow through the cooling passage 110.

In particular, for the embodiment shown the heat exchanger 116 is further in thermal communication with the accessory system 108 of the gas turbine engine 10 for transferring heat from the accessory system 108 to the airflow through the cooling passage 110. In such a manner the cooling passage 110 may provide cooling for the accessory system 108.

It will be appreciated that for the embodiment shown, although a single heat exchanger 116 and a single accessory system 108 are depicted, in other exemplary embodiments, other suitable configurations may be provided.

Figure 3:
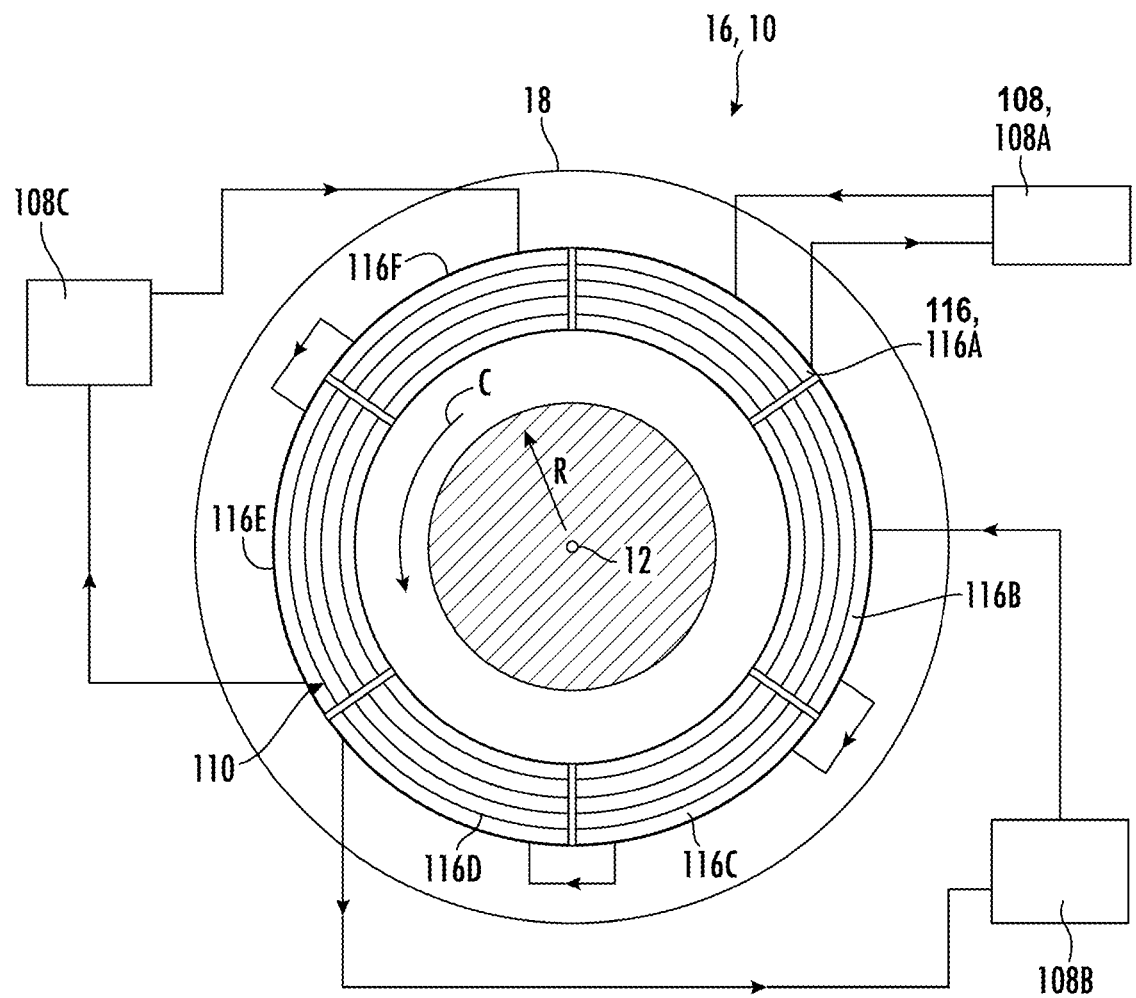
FIG. 3 is a schematic, cross-sectional view of a cooling passage of the turbomachine of FIG. 2 in accordance with an exemplary embodiment of the present disclosure.

For example, referring now briefly to FIG. 3, a schematic, cross-sectional view of a turbomachine 16 including a cooling passage 110 in accordance with an exemplary aspect of the present disclosure is provided. The exemplary cooling passage 110 and heat exchanger 116 of FIG. 3 may be configured in a similar manner as exemplary cooling passage 110 and heat exchanger 116 described above with reference to FIG. 2.

However, for the embodiment shown, the heat exchanger 116 is a first heat exchanger 116A of a plurality of heat exchangers 116 arranged along a circumferential direction C of the gas turbine engine 10. The plurality of heat exchangers 116 are each positioned within the cooling passage 110.

Notably, for the embodiment shown, the accessory system 108 is also a first accessory system 108A of a plurality of accessory systems 108. Each of the plurality of accessory systems 108 utilizes one or more of the plurality of heat exchangers 116. For example, the first accessory system 108A is in thermal communication with the first heat exchanger 116A. A second accessory system 108B of the plurality of accessory systems 108 is in thermal communication with a second heat exchanger 116B, a third heat exchanger 116C, and a fourth heat exchanger 116D. Notably, the second heat exchanger 116B, the third heat exchanger 116C, and the fourth heat exchanger 116D are arranged in serial flow order. Further, a third accessory system 108C of the plurality of accessory systems 108 is in thermal communication with a fifth heat exchanger 116E and a sixth heat exchanger 116F.

In such a manner, it will be appreciated that an airflow through the cooling passage 110 may be utilized as a heat sink for a variety of accessory systems 108 of the gas turbine engine 10.

Moreover, it will be appreciated that in other exemplary embodiments, other suitable structures may be provided to assist with generating an airflow through the cooling passage 110 of the present disclosure.

Figure 4:
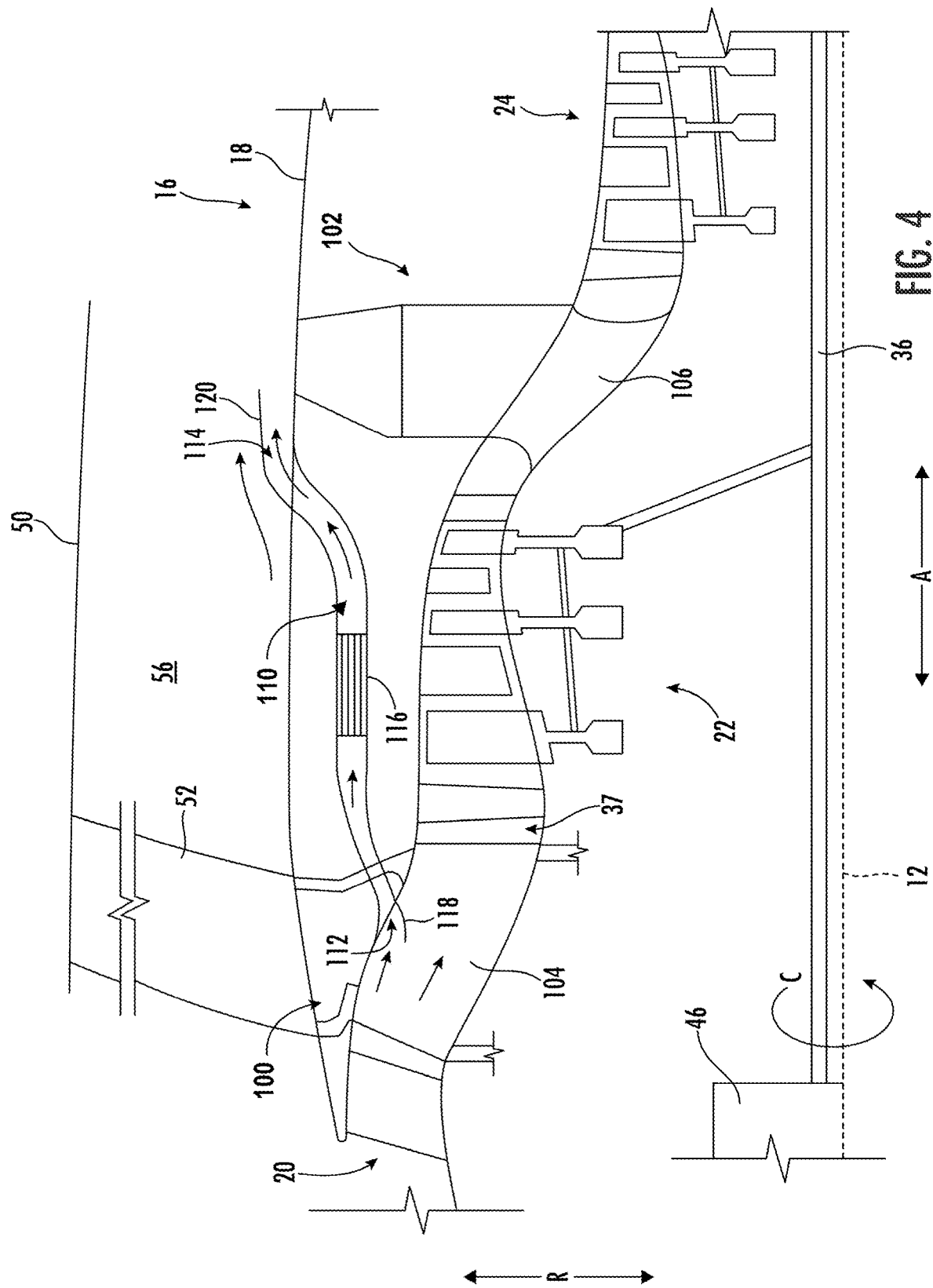
FIG. 4 is a schematic view of a portion of a turbomachine in accordance with another exemplary embodiment of the present disclosure.

For example, referring now to FIG. 4, a close-up, schematic view of a gas turbine engine 10 in accordance with another exemplary aspect of the present disclosure is provided. The exemplary gas turbine engine 10 depicted in FIG. 4 may be configured in a similar manner as the exemplary gas turbine engine 10 described above with reference to FIGS. 1 and 2. The same or similar numbers may refer to the same or similar part.

For example, the exemplary gas turbine engine 10 depicted in FIG. 4 generally includes a turbomachine 16 defining a cooling passage 110 extending between a CP inlet 112 and a CP outlet 114. The CP inlet 112 is in airflow communication with a working gas flowpath 37 of the turbomachine 16 at a location upstream of a compressor section of the turbomachine 16. The CP outlet 114 is in airflow communication with a bypass passage 56 of the gas turbine engine 10 defined between an outer nacelle 50 and the turbomachine 16.

Notably, as with the embodiment above, the CP inlet 112 is configured to receive an airflow compressed by a fan 38 of the gas turbine engine 10 (see FIG. 1), but is positioned upstream of any additional stages of compression. Accordingly, in order to assist with generating an airflow through the cooling passage 110, the turbomachine 16 includes a means for urging the airflow through the cooling passage 110.

More specifically, for the embodiment depicted, the means includes an inlet scoop 118 extending into the working gas flowpath 37 at the CP inlet 112 to divert a portion of an airflow through the working gas flowpath 37 through the CP inlet 112 of the cooling passage 110. In the embodiment depicted, the inlet scoop 118 is an annular scoop extending 360° about a longitudinal centerline 12 of the gas turbine engine 10. Further, for the embodiment depicted, the inlet scoop 118 is a fixed structure.

However, it will be appreciated that in other exemplary embodiments, the inlet scoop 118 may instead be configured in any other suitable manner (e.g., may be configured as a plurality of individual inlet scoops 118 arranged along a circumferential direction C of the gas turbine engine 10, may be a variable scoop capable of being deployed and retracted, etc.).

Further, for the embodiment depicted, the means for urging the airflow through the cooling passage 110 additionally includes a hood 120 extending over the CP outlet 114 of the cooling passage 110. The hood 120 extends into the bypass passage 56, such that a cross-sectional area of the bypass passage 56 at the hood 120 is less than a cross-sectional area of the bypass passage 56 immediately upstream of the hood 120. In such a manner, the hood 120 may form a nozzle to increase a speed of an airflow through the bypass passage 56, reducing a static pressure at the CP outlet 114 of the cooling passage 110. As such, the hood 120 may generate a delta pressure to urge the airflow through the cooling passage 110.

Figure 5:
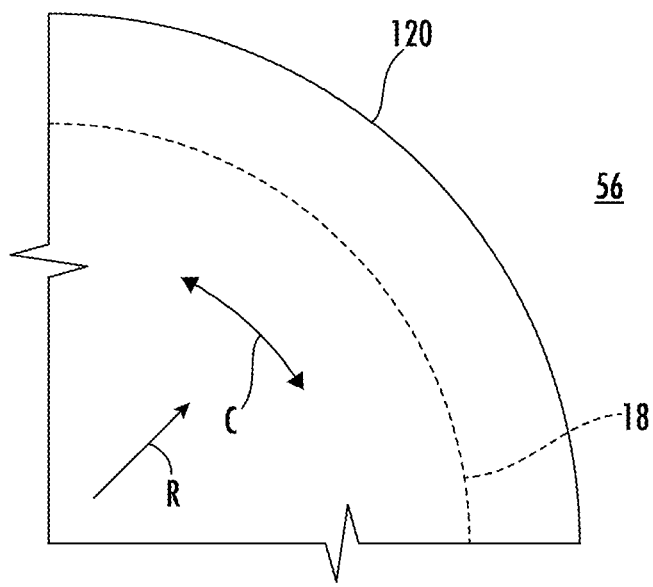
FIG. 5 is a schematic view of a hood of the exemplary turbomachine of FIG. 4.

Briefly, referring to FIG. 5, a partial, schematic, cross-sectional view of the hood 120 is depicted, as viewed along the axial direction A. As shown, for the embodiment depicted, the hood 120 is a relatively smooth hood 120.

Figure 6:
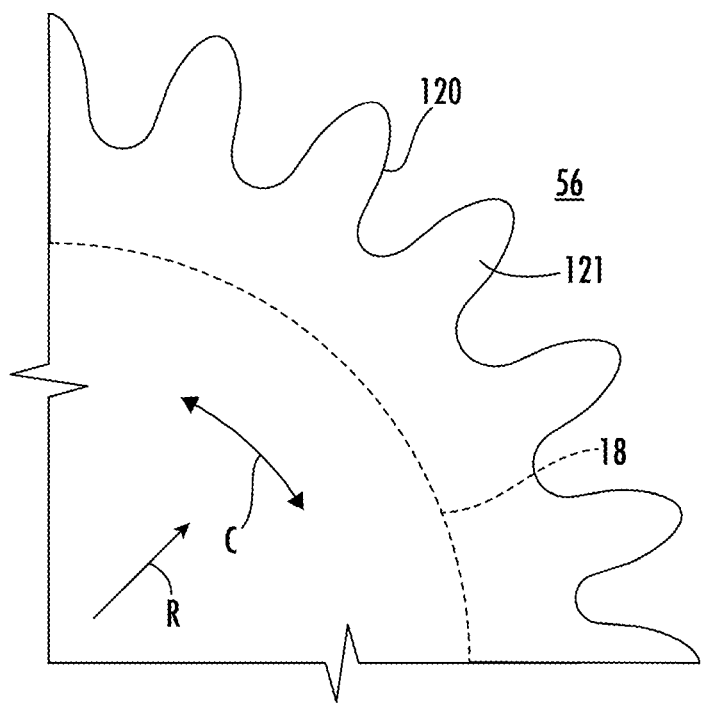
FIG. 6 is a schematic view of a hood of a turbomachine in accordance with an exemplary embodiment of the present disclosure.

Alternatively, referring briefly to FIG. 6, partial, schematic, cross-sectional view of a hood 120 in accordance with another exemplary embodiment of the present disclosure, as may be incorporated into the gas turbine engine 10 of FIG. 4 is depicted. For the embodiment of FIG. 6, the hood 120 is configured as a mixer having a plurality of lobes 121 spaced along a circumferential direction C having sequential peaks and valleys, such that a radial height of the hood 120 (and lobes 121) defines a sinusoidal pattern along the circumferential direction C. The plurality of lobes 121 may raise the radial height of the hood 120 locally along the circumferential direction C and therefore maximally reduce an exit static pressure at the CP outlet 114 at such local position by increasing the fan airflow Mach number at the local position over the lobe 121 of the hood 120.

Figure 8:
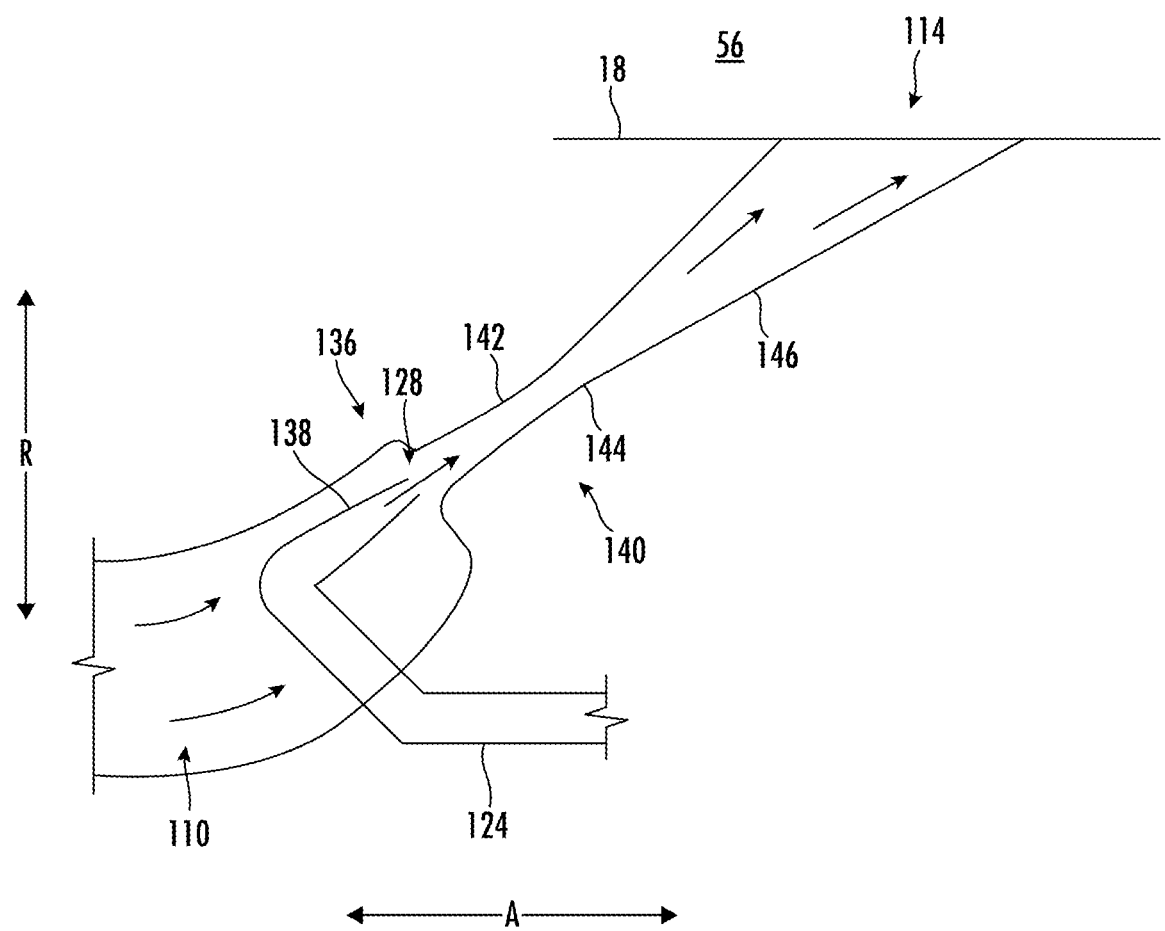
FIG. 8 is a schematic view of an ejector in accordance with another exemplary embodiment of the present disclosure.

Further, still, in other exemplary embodiments, the means for urging the airflow through the cooling passage 110 may be any other suitable means, such as a pump or compressor, or an ejector in airflow communication with a high-pressure air source. For example, in certain exemplary embodiments, the means may include an ejector in airflow communication with a variable bleed assembly, and further in airflow communication with the cooling passage 110 (see, e.g., FIG. 8 below). Alternatively, in other embodiments, the high pressure air source may be any other suitably high pressure air source, such as an LP compressor bleed, an HP compressor bleed, a turbine exhaust bleed, or a combination thereof. In certain embodiments, the ejector may be positioned downstream of the heat exchanger 116 (as shown in FIG. 8). Alternatively, in other embodiments, the ejector may be positioned upstream of the heat exchanger 116 (FIGS. 2 and 4).

Referring again to FIGS. 2 and 4, in one or more of the above exemplary embodiments, it will be appreciated that the cooling passage 110 may be configured to receive sufficient air flow therethrough to provide a desired amount of cooling to the one or accessory systems 108 of the gas turbine engine 10. For example, in certain exemplary embodiments, it will be appreciated that during operation of the gas turbine engine 10 at a first operating condition, the cooling passage 110 may be configured to receive between 2% and 20% of the total airflow through the working gas flowpath 37 at a location upstream of the CP inlet 112 and downstream of the turbomachine inlet 20. For example, in certain exemplary embodiments, the cooling passage 110 may be configured to receive between 4% and 12% of the total airflow through the working gas flowpath 37 at the location upstream of the CP inlet 112 and downstream of the turbomachine inlet 20. In certain exemplary aspects, the first operating condition may be a high power operating condition (e.g., a takeoff operating condition), wherein a relatively high amount of cooling may be desirable for the gas turbine engine 10.

It will be appreciated that including a turbomachine defining a cooling passage in accordance with one or more exemplary aspects of the present disclosure may allow for a relatively cool airflow to be utilized for cooling one or accessory systems of the gas turbine engine prior to such airflow being subjected to additional stages of compression. In such a manner, the cooling passage may provide for a relatively efficient way to cool the various accessory systems, as the airflow is utilized prior to work in the form of compression having been applied thereto. Further, by transferring heat to such airflow prior to such airflow being provided to the bypass passage, additional energy may be transferred to the bypass passage, which may increase an overall propulsive efficiency of the gas turbine engine.

Figure 7:
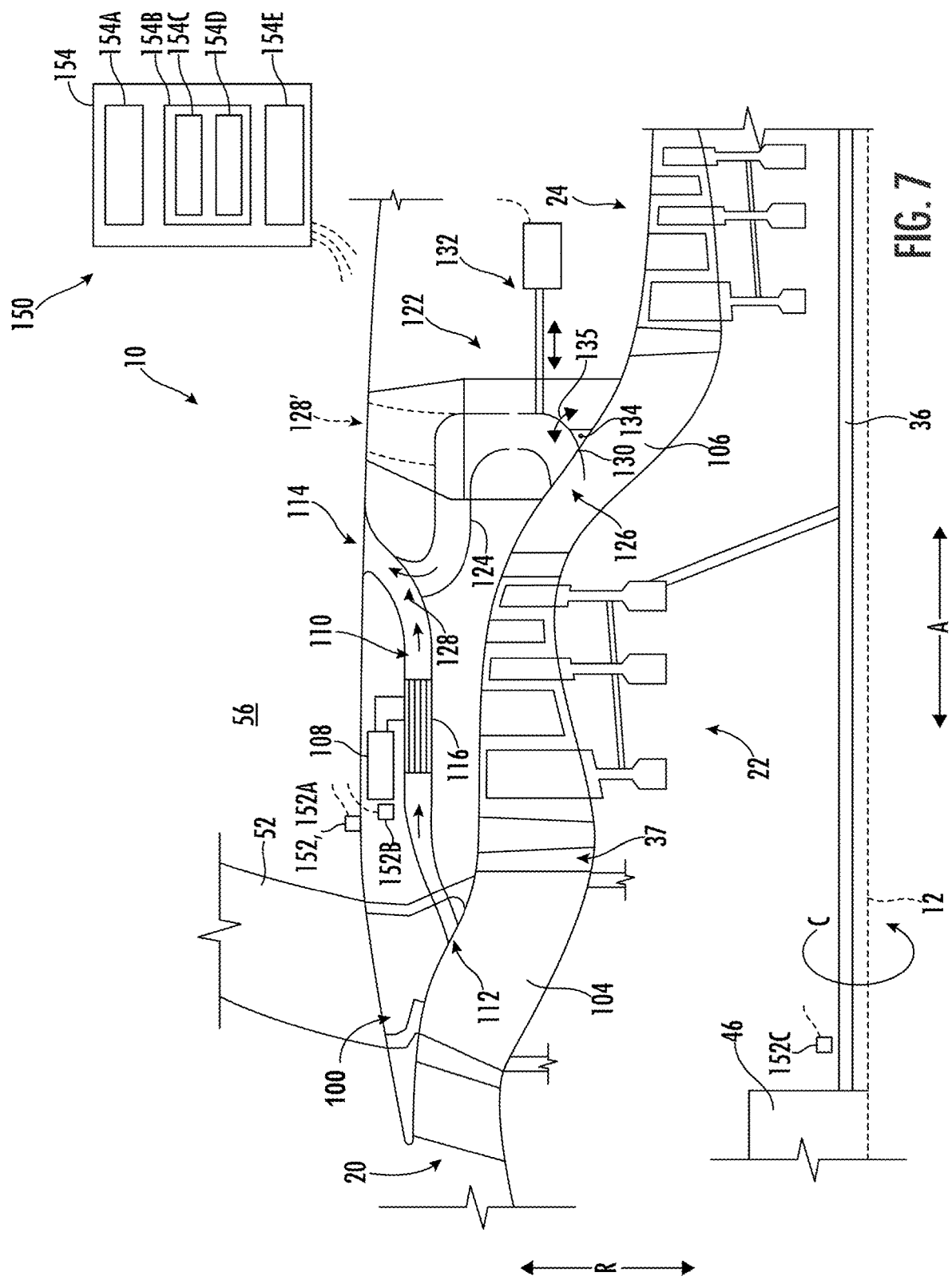
FIG. 7 is a schematic view of a portion of a turbomachine in accordance with another exemplary embodiment of the present disclosure.

Referring now to FIG. 7, a close-up, schematic view of a gas turbine engine 10 in accordance with yet another exemplary aspect of the present disclosure is provided. The exemplary gas turbine engine 10 depicted in FIG. 7 may be configured in a similar manner as exemplary gas turbine engine 10 described above with reference to FIGS. 1 and 2. The same or similar numbers may refer to the same or similar part.

For example, the exemplary gas turbine engine 10 depicted in FIG. 7 generally includes a turbomachine 16 defining a cooling passage 110 extending between a CP inlet 112 and a CP outlet 114. The CP inlet 112 is in airflow communication with a working gas flowpath 37 of the turbomachine 16 at a location upstream of a compressor section of the turbomachine 16. The CP outlet 114 is in airflow communication with a bypass passage 56 of the gas turbine engine 10 defined between an outer nacelle 50 (not shown; see FIG. 1) and the turbomachine 16.

Notably, as with the embodiment above, the CP inlet 112 is configured to receive an airflow compressed by a fan 38 of the gas turbine engine 10 (see FIG. 1), but is positioned upstream of any additional stages of compression. Accordingly, in order to assist with generating an airflow through the cooling passage 110, the turbomachine 16 includes a means for urging the airflow through the cooling passage 110.

More specifically, for the embodiment of FIG. 7, the gas turbine engine 10 further includes a variable bleed assembly 122. The variable bleed assembly 122 includes a variable bleed duct 124 extending between a VB inlet 126 and a VB outlet 128.

The VB inlet 126 is in airflow communication with the working gas flowpath 37 at a location downstream the CP inlet 112. In particular, for the embodiment depicted, the CP inlet 112 is in airflow communication with the working gas flowpath 37 at a location upstream of a compressor of the compressor section, and more specifically, of an LP compressor 22 of the compressor section, and the VB inlet 126 is in airflow communication with the working gas flowpath 37 at a location downstream of the LP compressor 22. More specifically, still, for the embodiment shown, the VB inlet 126 is in airflow communication with the working gas flowpath 37 at a location upstream of an HP compressor 24 and aligned with a compressor mid-frame 102 of the turbomachine 16 along an axial direction A of the gas turbine engine 10.

Referring still to FIG. 7, the VB outlet 128 is in airflow communication with the cooling passage 110. More specifically, for the embodiment depicted the VB outlet 128 is in airflow communication with the cooling passage 110 at a location downstream of a heat exchanger 116 (the heat exchanger 116 being in thermal communication with an airflow through the cooling passage 110).

As will be appreciated from the exemplary embodiment depicted in FIG. 7, in the embodiment depicted, substantially all of an airflow through the variable bleed duct 124 (i.e., at least 90% of the airflow through the variable bleed duct 124) is provided through the VB outlet 128 to the cooling passage 110.

It will be appreciated, however, that in other embodiments, it may not be necessary to provide substantially all of the airflow through the variable bleed duct 124 to the cooling passage 110 through the VB outlet 128. In such a manner, the VB outlet 128 may be a first VB outlet, and the variable bleed duct 124 may further include a second VB outlet 128'. The second VB outlet 128', as is depicted in phantom may be in direct airflow communication with the bypass passage 56 (i.e., may provide the airflow from the variable bleed duct 124 to the bypass passage 56 without merging or mixing with any other airflow upstream of the bypass passage 56). In the embodiment depicted, the variable bleed duct 124 splits to extend to both the first VB outlet 128 and the second VB outlet 128'.

As will be appreciated, providing the airflow through the variable bleed duct 124 to the cooling passage 110 through the VB outlet 128 may urge the airflow through the cooling passage 110. In such a manner, the variable bleed assembly 122 may be a means for urging the airflow through the cooling passage 110.

In order to modulate the amount of airflow through the cooling passage 110, the variable bleed assembly 122 may be capable of varying an amount of airflow provided therethrough to the cooling passage 110. In particular, for the embodiment of FIG. 7, the variable bleed assembly 122 includes a variable bleed valve 130 for varying the amount of airflow through the variable bleed duct 124. In the embodiment depicted, the variable bleed valve 130 is located at an upstream end of the variable bleed duct 124 and includes the VB inlet 126.

More specifically, for the embodiment depicted the variable bleed assembly 122 further includes an actuator 132 coupled to the variable bleed valve 130 configured to actuate the variable bleed valve 130 about a pin 134, to pivot the variable bleed valve 130 between a deployed position (shown) and a stowed position (not shown), and optionally various positions therebetween, as is illustrated by arrow 135. The variable bleed valve 130 may be moved from the deployed position to the stowed position by rotating in a clockwise direction about the pin 134 in the view depicted, such that the VB inlet 126 is no longer exposed to the working gas flowpath 37.

The variable bleed valve 130 may be moved between the fully deployed position (shown) whereby the variable bleed duct 124 extracts a maximum amount of airflow from the working gas flowpath 37, the fully stowed position whereby the variable bleed valve 130 extracts substantially no airflow from the working gas flowpath 37 (i.e., less than 5% of the maximum amount of airflow extracted), and any suitable position therebetween (one or more partially deployed positions).

The airflow from the variable bleed duct 124 may be provided to the cooling passage 110 from the VB outlet 128 in any suitable manner. For example, referring briefly to FIG. 8, it will be appreciated that in certain exemplary embodiments, the VB outlet 128 forms at least in part an ejector 136 with the cooling passage 110. In particular, for the embodiment of FIG. 8, the VB outlet 128 includes a fluid nozzle 138 configured to provide a relatively high pressure fluid flow. Further, the cooling passage 110 includes a nozzle portion 140 that includes a converging inlet nozzle 142, a diffuser throat 144, and a diverging outlet diffuser 146 arranged in serial order, with the fluid nozzle 138 of the VB outlet 128 oriented to provide the relatively high pressure fluid into the converging inlet nozzle 142. As will be appreciated, providing the high pressure fluid flow through the fluid nozzle 138 with the nozzle portion 140 located downstream, may urge a relatively low pressure fluid flow therethrough to increase the amount of airflow through the cooling passage 110.

Figure 9:
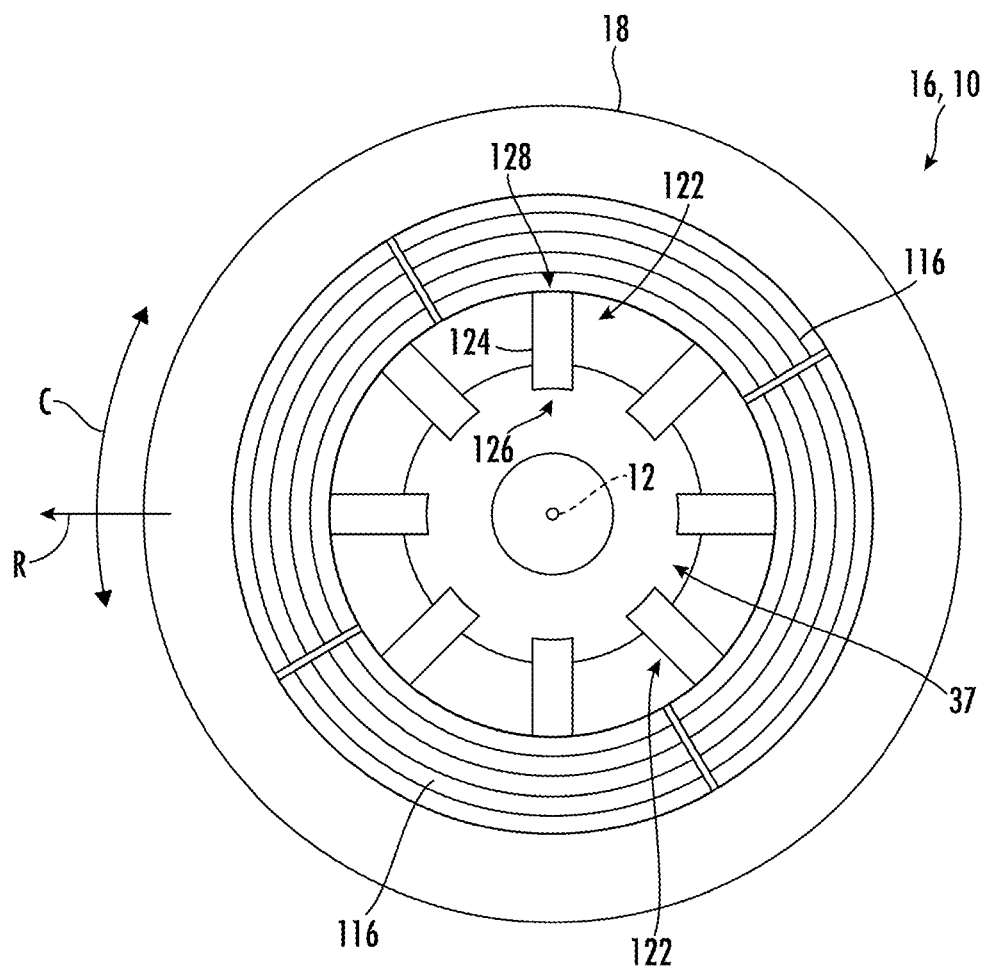
FIG. 9 is a schematic, cross-sectional view of a cooling passage and variable bleed assembly in accordance with an exemplary embodiment of the present disclosure.

Moreover, it should be appreciated from the description herein and the Figures, that the variable bleed duct 124 having the VB inlet 126 and the VB outlet 128 may be a first variable bleed duct 124 of a plurality of variable bleed ducts 124 of the variable bleed assembly 122. For example, referring briefly to FIG. 9, a schematic, cross-sectional view is provided showing the variable bleed assembly 122 and the cooling passage 110 described above with reference to FIG. 7. As noted, the cooling passage 110 is an annular cooling passage. Further, the variable bleed assembly 122 includes the plurality of variable bleed ducts 124 spaced along the circumferential direction C of the gas turbine engine 10. Each of the variable bleed ducts 124 generally extends between the respective VB inlets 126 in airflow communication with the working gas flowpath 37 (FIG. 7) and respective VB outlets 128 in airflow communication with the cooling passage 110. Each of the plurality of variable bleed ducts 124 depicted in FIG. 9 may be configured in a similar manner as the exemplary variable bleed duct 124 described above with reference to FIGS. 7 and 8.

Referring now back to FIG. 7, it will be appreciated for the embodiment depicted, the gas turbine engine 10 further includes a controller 150 operably coupled to the variable bleed assembly 122, and one or more sensors 152. The one or more sensors 152 may be configured to sense data indicative of an operating condition of the gas turbine engine 10. For example, the one or more sensors 152 generally includes a bypass passage sensor 152A (e.g., configured to sense one or more of a pressure, a temperature, or an airflow rate of airflow through the bypass passage 56), an accessory system sensor 152B (e.g., configured to sense data indicative of a condition of the accessory system 108), a turbomachine sensor 152C (e.g., configured to sense data indicative of an operating condition of the turbomachine, such as a rotational speed sensor, a temperature sensor, a pressure sensor, etc.).

As noted, the exemplary controller 150 depicted in FIG. 7 is configured to receive the data sensed from the one or more sensors (sensors 152A, 152B, 152C) for the embodiment shown) and, e.g., may make control decisions for the variable bleed assembly 122 based on the received data.

In one or more exemplary embodiments, the controller 150 depicted in FIG. 7 may be a stand-alone controller 150 for the variable bleed assembly 122, or alternatively, may be integrated into one or more of a controller for the gas turbine engine 10 with which the variable bleed assembly 122 is integrated, a controller for an aircraft including the gas turbine engine 10 with which the variable bleed assembly 122 is integrated, etc.

Referring particularly to the operation of the controller 150, in at least certain embodiments, the controller 150 can include one or more computing device(s) 154. The computing device(s) 154 can include one or more processor(s) 154A and one or more memory device(s) 154B. The one or more processor(s) 154A can include any suitable processing device, such as a microprocessor, microcontroller, integrated circuit, logic device, and/or other suitable processing device. The one or more memory device(s) 154B can include one or more computer-readable media, including, but not limited to, non-transitory computer-readable media, RAM, ROM, hard drives, flash drives, and/or other memory devices.

The one or more memory device(s) 154B can store information accessible by the one or more processor(s) 154A, including computer-readable instructions 154C that can be executed by the one or more processor(s) 154A. The instructions 154C can be any set of instructions that when executed by the one or more processor(s) 154A, cause the one or more processor(s) 154A to perform operations. In some embodiments, the instructions 154C can be executed by the one or more processor(s) 154A to cause the one or more processor(s) 154A to perform operations, such as any of the operations and functions for which the controller 150 and/or the computing device(s) 154 are configured, the operations for operating a variable bleed assembly 122 (e.g., method 200), as described herein, and/or any other operations or functions of the one or more computing device(s) 154. The instructions 154C can be software written in any suitable programming language or can be implemented in hardware. Additionally, and/or alternatively, the instructions 154C can be executed in logically and/or virtually separate threads on the one or more processor(s) 154A. The one or more memory device(s) 154B can further store data 154D that can be accessed by the one or more processor(s) 154A. For example, the data 154D can include data indicative of power flows, data indicative of engine/aircraft operating conditions, and/or any other data and/or information described herein.

The computing device(s) 154 can also include a network interface 154E used to communicate, for example, with the other components of the variable bleed assembly 122, the gas turbine engine 10 incorporating variable bleed assembly 122, the aircraft incorporating the gas turbine engine 10, etc. For example, in the embodiment depicted, as noted above, the gas turbine engine 10 and/or variable bleed assembly 122 includes one or more sensors for sensing data indicative of one or more parameters of the gas turbine engine, the variable bleed assembly 122, the cooling passage 110, the accessory system(s) 108, or a combination thereof. The controller 150 of the variable bleed assembly 122 is operably coupled to the one or more sensors through, e.g., the network interface 154E, such that the controller 150 may receive data indicative of various operating parameters sensed by the one or more sensors during operation. Further, for the embodiment shown the controller 150 is operably coupled to, e.g., actuator 132. In such a manner, the controller 150 may be configured to vary an amount of airflow through the variable bleed assembly 122 and into the cooling passage 110 in response to, e.g., the data sensed by the one or more sensors.

The network interface 154E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

For the embodiment depicted, the controller 150 is configured to actuate the variable bleed valve 130 to increase or decrease the amount of airflow through the variable bleed duct 124. In certain exemplary aspects, the controller 150 may further be configured to receive data indicative of an operating condition of the gas turbine engine 10 (e.g., sensed data from the one or more sensors 152). In certain exemplary aspects, the controller 150 may actuate the variable bleed valve 130 to increase or decrease the amount of airflow through the variable bleed duct 124 in response to the data indicative of the operating condition.

For example, in response is to receiving data indicative of an operating condition whereby a relatively high amount of cooling may be needed, the controller 150 may be configured to actuate the variable bleed valve 130 to increase the amount of airflow through the variable bleed duct 124 (e.g., move the variable bleed valve 130 to a fully deployed position) to increase the amount of airflow through the annular cooling passage 110. By contrast, in response to receiving data indicative of an operating condition whereby a relatively low amount of cooling may be needed, the controller 150 may be configured to actuate the variable bleed valve 130 to decrease the amount of airflow through the variable bleed duct 124 (e.g., move the variable bleed valve 130 to a fully stowed position) to decrease the amount of airflow through the annular cooling passage 110.

Figure 10:
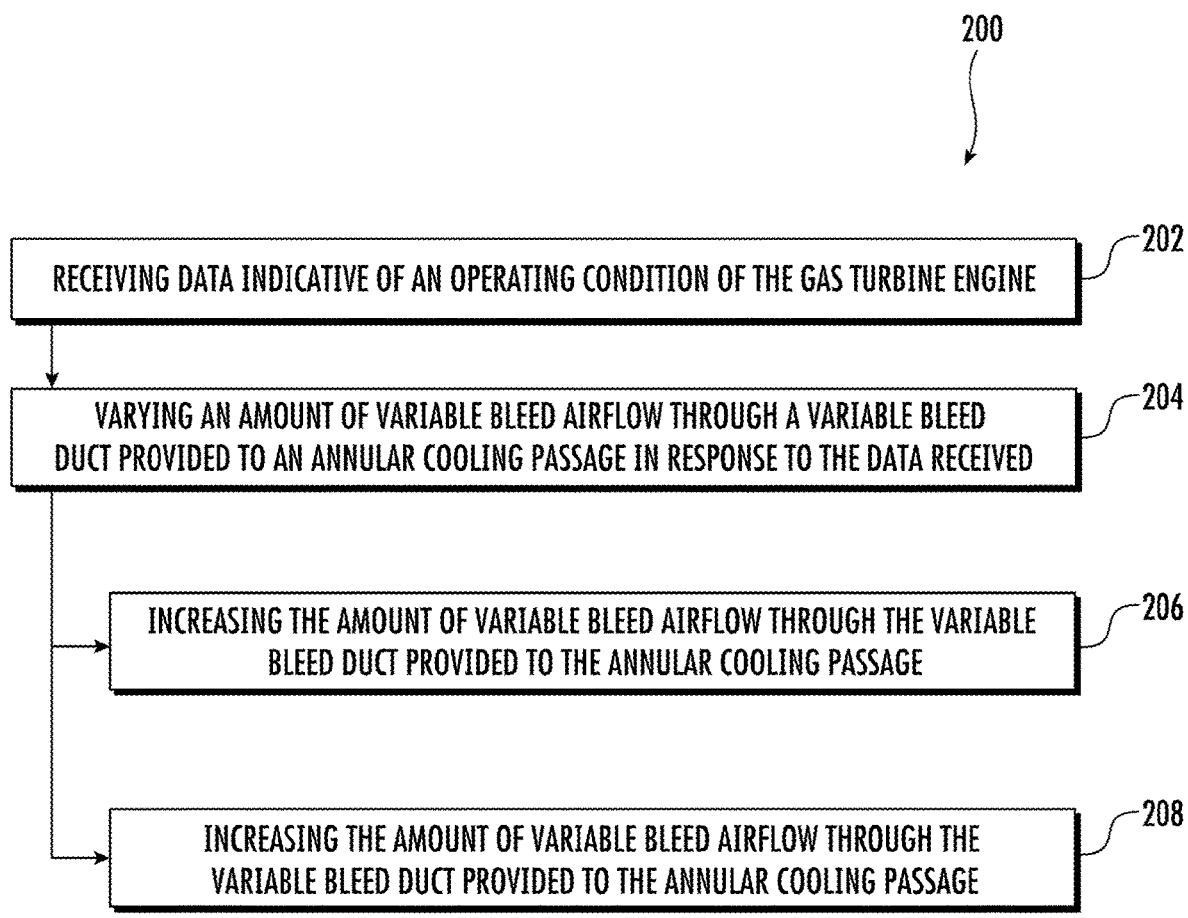
FIG. 10 is a flow diagram of a method of operating a gas turbine engine in accordance with an exemplary aspect of the present disclosure.

Referring now to FIG. 10, a method 200 of operating a gas turbine engine 10 in accordance with an exemplary aspect of the present disclosure is provided. The method 200 may generally be utilized with one or more of the exemplary gas turbine engines 10 described above with reference to FIGS. 1 through 9. Alternatively, the exemplary method 200 may be utilized with any other suitable gas turbine engine 10.

The method 200 generally includes at (202) receiving data indicative of an operating condition of the gas turbine engine, and at (204) varying an amount of variable bleed airflow through a variable bleed duct provided to an annular cooling passage in response to the data received at (202). The annular cooling passage extends between a CP inlet in airflow communication with a working gas flowpath of the turbomachine and a CP outlet in airflow communication with a bypass passage of the gas turbine engine.

In certain exemplary aspects of the present disclosure, the operating condition is a low fan power operating condition. For example, the low fan power operating condition may be a ground idle operating condition or a flight idle descent operating condition. With such an exemplary aspect, varying the amount of variable bleed airflow through the variable bleed duct provided to the annular cooling passage at (204) may include at (206) increasing the amount of variable bleed airflow through the variable bleed duct provided to the annular cooling passage.

In certain exemplary aspects of the present disclosure, the operating condition is indicative of an ambient temperature. For example, the data received may be indicative of the ambient temperature being above a predetermined threshold. With such an exemplary aspect, varying the amount of variable bleed airflow through the variable bleed duct provided to the annular cooling passage at (204) may include at (208) increasing the amount of variable bleed airflow through the variable bleed duct provided to the annular cooling passage.

Figure 11:
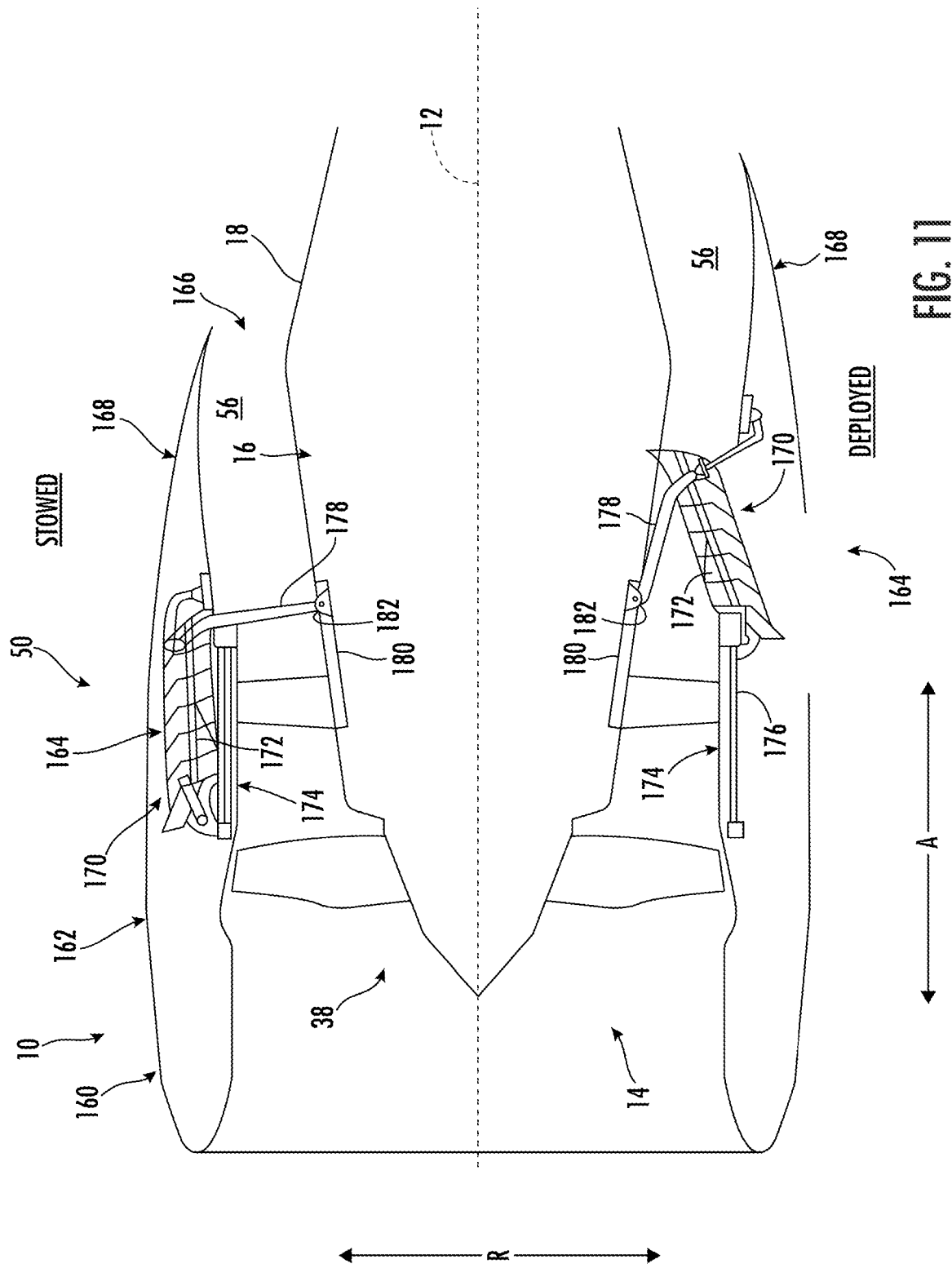
FIG. 11 is a cross-sectional view of a gas turbine engine in accordance with another exemplary aspect of the present disclosure.

Referring now to FIG. 11, a gas turbine engine 10 in accordance with another exemplary aspect of the present disclosure is provided. The exemplary gas turbine engine 10 of FIG. 11 may be configured in a similar manner as exemplary gas turbine engine 10 described above with reference to FIG. 1. For example, the exemplary gas turbine engine 10 of FIG. 11 generally includes a fan section 14 having a fan 38, a turbomachine 16 (depicted schematically), and an outer nacelle 50.

For the embodiment depicted, the outer nacelle 50 generally includes an inlet assembly 160 and a fan cowl 162, and the gas turbine engine 10 further includes a thrust reverser assembly 164 at least partially integrated into the outer nacelle 50. A top half of the exemplary gas turbine engine 10 in FIG. 11 is depicted with the thrust reverser assembly 164 in a stowed configuration, and a bottom half of the exemplary gas turbine engine 10 of FIG. 11 is depicted with the thrust reverser assembly 164 in a deployed configuration.

The inlet assembly 160 is positioned at a forward end of the outer nacelle 50 and the fan cowl 162 is positioned aft of the inlet assembly 160 and at least partially surrounds the fan 38. The thrust reverser assembly 164 may, in turn, be positioned at least partially or substantially completely within the fan cowl 162 when in the stowed configuration. As is depicted, an outer casing 18 of the turbomachine 16 defines a radially inward boundary of a bypass passage 56 and the outer nacelle 50 defines a radially outward boundary of the bypass passage 56. Bypass air of the gas turbine engine 10 passes through the bypass passage 56 and exits through a fan exit nozzle 166 during certain operations.

The thrust reverser assembly 164 of FIG. 11 may include a translating cowl (transcowl) 168 slidably mounted to the fan cowl 162, and a cascade assembly 170. The transcowl 168 is located aft of the fan cowl 162 and circumscribes an outer casing 18 of the turbomachine 16. When in the deployed configuration, the cascade assembly 170 is also located at least partially aft of the fan cowl 162 and circumscribes the turbomachine 16. By contrast, when in the stowed configuration the cascade assembly 170 is stowed substantially completely within the fan cowl 162.

Referring still to FIG. 11, the cascade assembly 170 depicted is formed of and includes a plurality of individual cascade segments 172 that are circumferentially spaced around a circumference of the outer nacelle 50. As is evident from FIG. 11, the cascade segments 172 of the cascade assembly 170 may be adapted to deploy from an axially stowed configuration, shown in the upper half of FIG. 11, to an axially deployed configuration shown in the lower half of FIG. 11. For the embodiment depicted, the transcowl 168 and cascade assembly 170 are adapted to be translated in unison in an aft direction of the gas turbine engine 10, generally along the axial direction A, when the thrust reverser assembly 164 is moved from the stowed configuration to the deployed configuration (i.e., is deployed). More particularly, to deploy the cascade assembly 170 into the bypass passage 56, the transcowl 168 is moved aft from the fan cowl 162 generally along the axial direction A and the cascade assembly 170 is translated and pivoted, causing a flow of bypass air within the bypass passage 56 to be diverted through the deployed cascade assembly 170 to provide a thrust reversal effect.

In order to facilitate the above movement of the thrust reverser assembly 164, the thrust reverser assembly 164 includes one or more actuation assemblies 174. The actuation assemblies 174 are configured to move the thrust reverser assembly 164 from the stowed configuration to the deployed configuration. The actuation assemblies 174 can be of any suitable type and can be driven by, e.g., pneumatic, hydraulic, or electric motors. Additionally, the cascade segments 172 are depicted as coupled to a fixed structure of the outer nacelle 50 with guided connections 176. Further, FIG. 11 represents the cascade segments 172 as pivotally coupled to the outer casing 18 of the turbomachine 16 with drag links 178, and represent the transcowl 168 as pivotally coupled to the cascade segments 172 through drag links 178 for translation therewith.

More specifically, for the embodiment shown, the thrust reverser assembly 164 further includes an inner thrust reverser support 180 positioned on, coupled to, or integrated with the turbomachine 16. The exemplary inner thrust reverser support 180 depicted generally includes a plurality of thrust reverser link attachments 182 arranged along the circumferential direction C of the gas turbine engine 10. For the embodiment shown, the drag links 178 are attachable to the plurality of thrust reverser link attachments 182, such that the inner thrust reverser support 180 may provide axial and radial support for the cascade assembly 170 through the plurality of drag links 178.

Figure 12:
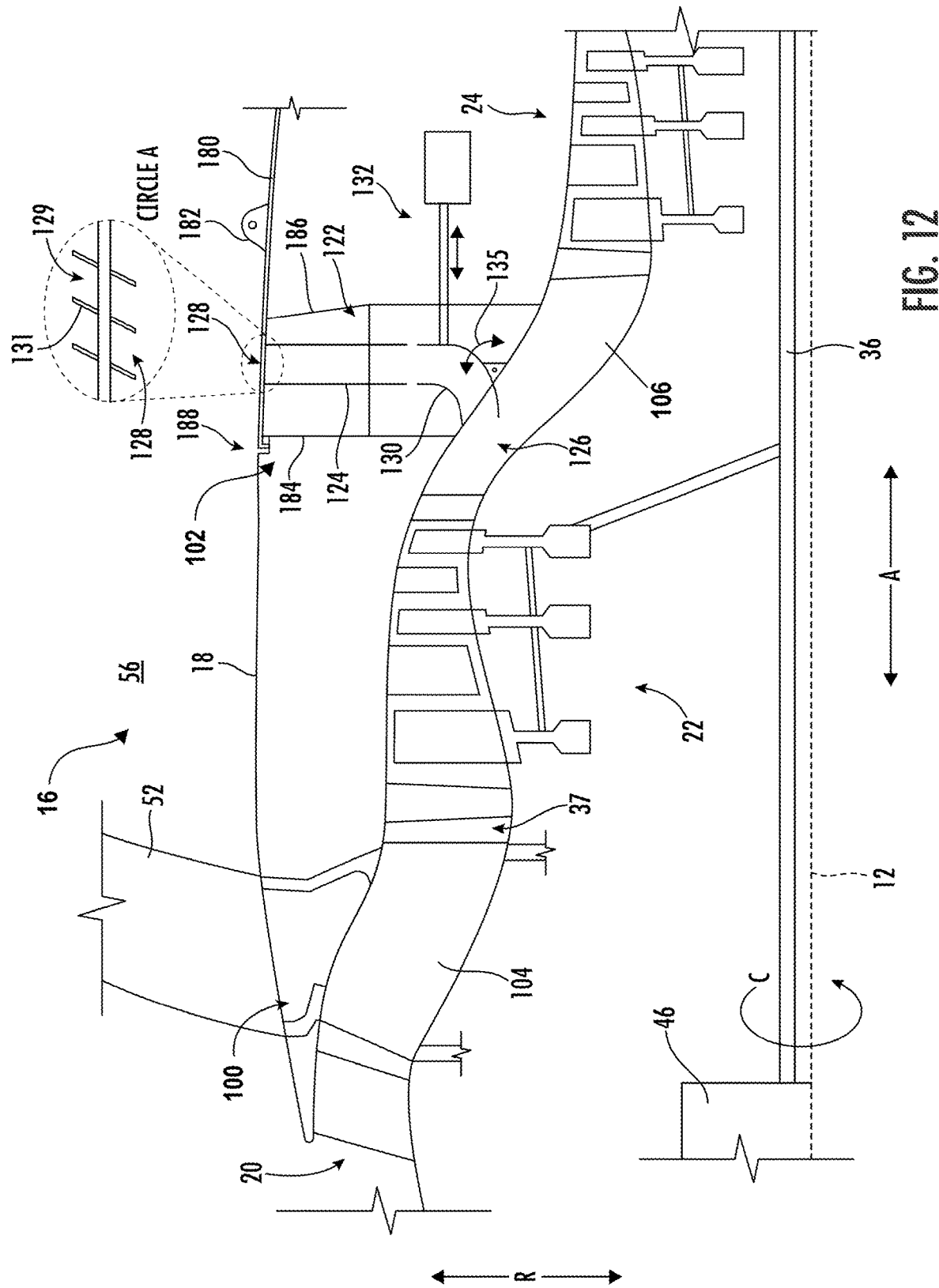
FIG. 12 is a schematic view of a portion of a turbomachine in accordance with another exemplary embodiment of the present disclosure.

Referring now to FIG. 12, a close-up, schematic view is depicted of a portion of the exemplary gas turbine engine 10 described above with reference to FIG. 11. In particular, the view of FIG. 12 depicts a close-up of the turbomachine 16 of FIG. 1. The turbomachine 16 generally includes a compressor section having an LP compressor 22 and an HP compressor 24, defining at least in part a working gas flowpath 37. The turbomachine 16 further defines a turbomachine inlet 20 to the working gas flowpath 37. Further, for the embodiment depicted, the turbomachine 16 includes a compressor forward frame 100 and a compressor mid-frame 102. The compressor forward frame 100 includes a strut 104 extending through the working gas flowpath 37 at a location upstream of the LP compressor 22 and downstream of the turbomachine inlet 20. Similarly, the compressor mid-frame 102 includes a strut 106 extending through the working gas flowpath 37 at a location downstream of the LP compressor 22 and upstream of the HP compressor 24. Moreover, in the embodiment depicted the compressor mid-frame 102 generally includes a forward member 184 and an aft member 186 spaced apart from one another along an axial direction A of the gas turbine engine 10.

The compressor forward frame 100 and the compressor mid-frame 102 may provide structural support to various components of the gas turbine engine 10.

Moreover, the exemplary gas turbine engine 10 depicted schematically in FIG. 12 further includes a variable bleed assembly 122 and the thrust reverser assembly 164, with the thrust reverser assembly 164 including the inner thrust reverser support 180. The variable bleed assembly 122 generally includes a variable bleed duct 124 extending between a VB inlet 126 and a VB outlet 128. The VB inlet 126 is in airflow communication with the working gas flowpath 37 at a location aligned with the compressor mid-frame 102. Moreover, for the embodiment depicted, the VB outlet 128 is in airflow communication with the bypass passage 56 at a location aft of the forward member 184 of the compressor mid-frame 102, and forward of the aft member 186 of the compressor mid-frame 102.

Further, for the embodiment depicted, the inner thrust reverser support 180 includes a forward interface 188 coupled to the forward member 184 of the compressor mid-frame 102. The forward interface 188 is configured to provide axial support for the inner thrust reverser support 180, as will be explained in more detail below. In such a manner, the inner thrust reverser support 180 extends from the forward member 184 of the compressor mid-frame 102, past the aft member 186 of the compressor mid-frame 102. With such a configuration, it will be appreciated that the VB outlet 128 is in airflow communication with the bypass passage 56 through the inner thrust reverser support 180. In at least certain exemplary embodiments, as is depicted in the callout Circle A in FIG. 12, the variable bleed assembly 122 may additionally include a cover 129 at the VB outlet 128 with one or more features to turn an airflow from the VB outlet 128 axially. The cover 129 depicted includes a plurality of louvers 131 that may be fixed or rotatable to provide such functionality.

Figure 13:
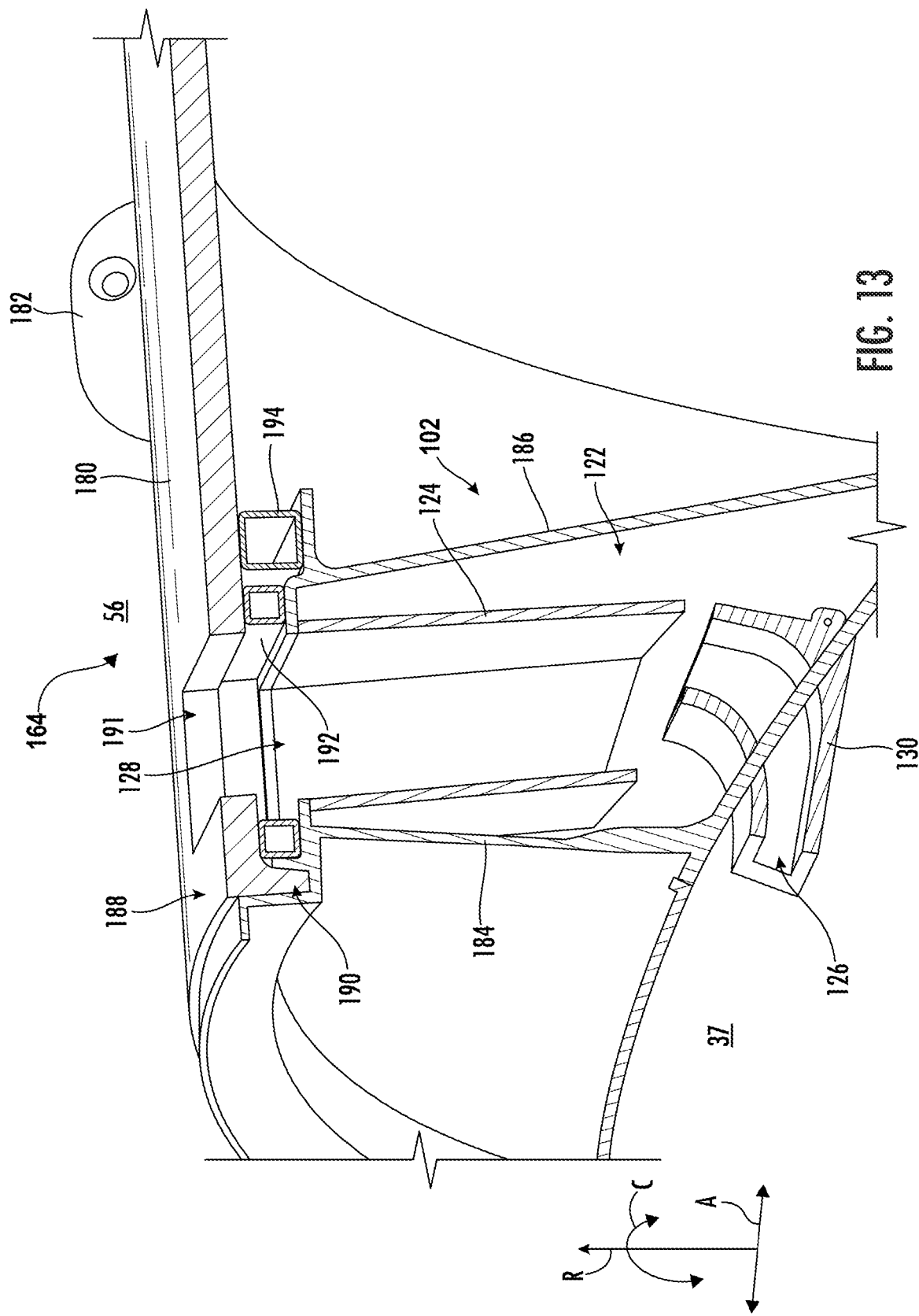
FIG. 13 is an isometric, cross-sectional view of a variable bleed assembly in accordance with an exemplary embodiment of the present disclosure.

More specifically, referring now to FIG. 13, a cross-sectional, isometric view is provided of the compressor mid-frame 102, variable bleed assembly 122, and inner thrust reverser support 180 of FIG. 12.

As noted above, the inner thrust reverser support 180 includes the forward interface 188 coupled to the forward member 184 of the compressor mid-frame 102. More specifically, for the embodiment depicted, the forward interface 188 includes a radial member (not separately labeled) extending inwardly along a radial direction R of the gas turbine engine 10. The forward member 184 of the compressor mid-frame 102 defines a circumferential groove 190 extending along the circumferential direction C in defining a radial depth. The radial member of the forward interface 188 is positioned within the circumferential groove 190 to couple the inner thrust reverser support 180 to the compressor mid-frame 102. As will be appreciated from the view of FIG. 13, the inner thrust reverser support 180 defines an annular shape, and extends substantially 360° (i.e., at least about 90%) around the turbomachine 16.

As is also briefly mentioned above, the VB outlet 128 of the variable bleed duct 124 is in airflow communication with the bypass passage 56 through the inner thrust reverser support 180, and more specifically through an opening 191 defined in the inner thrust reverser support 180. Although not depicted for clarity in FIG. 13, the cover 129 described above with reference to FIG. 12 may be positioned in or across the opening 191 defined in the inner thrust reverser support 180.

Referring still to FIG. 13, in the embodiment depicted, the thrust reverser assembly 164 includes a seal 192 positioned between the inner thrust reverser support 180 and one or both of the compressor mid-frame 102 and the variable bleed duct 124. In particular, for the embodiment depicted, the seal 192 is positioned between the inner thrust reverser support 180 and the compressor mid-frame 102. The seal 192 may prevent undesirable airflow leakage into the compressor mid-frame 102, and/or aft the compressor mid-frame 102, which may urge the inner thrust reverser support 180 out of alignment (e.g., the radial member out of the circumferential groove 190).

Briefly, it will further be appreciated that for the embodiment depicted, the thrust turbomachine 16 further includes a fire seal 194 positioned between an extension of the aft member 186 of the compressor mid-frame 102 and the inner thrust reverser support 180. The fire seal 194 is an annular seal, extending 360° in the circumferential direction C.

It will be appreciated that in order to facilitate assembly of the inner thrust reverser support 180, the inner thrust reverser support 180 may be configured as a two-piece assembly. For example, referring briefly to FIG. 14, a schematic view is provided of the inner thrust reverser support 180, as viewed along an axial direction A of the gas turbine engine 10 with which the inner thrust reverser support 180 may be installed. As will be appreciated, the inner thrust reverser support 180 includes a first member 196 and a second member 198. The first member 196 and the second member 198 together extend substantially 360° when coupled together. In order to install, e.g., the radial member of the inner thrust reverser support 180 into the circumferential groove 190 of the forward member 184 of the compressor mid-frame 102 (see FIG. 13), the first member 196 and the second member 198 of the inner thrust reverser support 180 may be individually installed (as is depicted in phantom in FIG. 14).

In such a manner, it will be appreciated that the first member 196 and the second member 198 may together define a hinged connection 197 (i.e., any mechanical connection that allows for the first member to pivot relative to the second member, such as a pinned connection) on one side and a releasable mechanical connection 199 (i.e., any mechanical connection that allows for a release without damaging the connection during a normal course, such as a bolted connection, a ratcheted connection, a latched connection, or the like) on an opposite side.

It will be appreciated, however, that in other exemplary embodiments, the forward interface 188 (FIG. 13) of the inner thrust reverser support 180 may be configured in any other suitable manner. For example, in other embodiments, the forward interface 188 may utilize any other suitable mechanical connection, such as, e.g., bolts, screws, rivets, welding, complementary geometries (e.g., dovetails), etc.

Further, it will be appreciated that although the exemplary variable bleed assembly 122 depicted in FIGS. 11 and 12 includes a single variable bleed duct 124 extending between a single VB inlet 126 and a single VB outlet 128, in other exemplary embodiments, the variable bleed assembly 122 may include a plurality of variable bleed ducts 124 spaced along a circumferential direction C (each with a respective VB inlet 126). The plurality of variable bleed ducts 124 may be in fluid communication with a plenum, with the plenum defining the VB outlet 128, and a seal 192 around the VB outlet 128. Alternatively, the plurality of variable bleed ducts 124 may each define a separate VB outlet 128, and the seal 192 may extend around the plurality of VB outlets 128.

Further, still, it will be appreciated that although exemplary VB outlet 128 of the exemplary variable bleed duct 124 of FIGS. 12 and 13 extends through the inner thrust reverser support 180, in other exemplary embodiments, any other suitable configuration may be provided.

Figure 15:
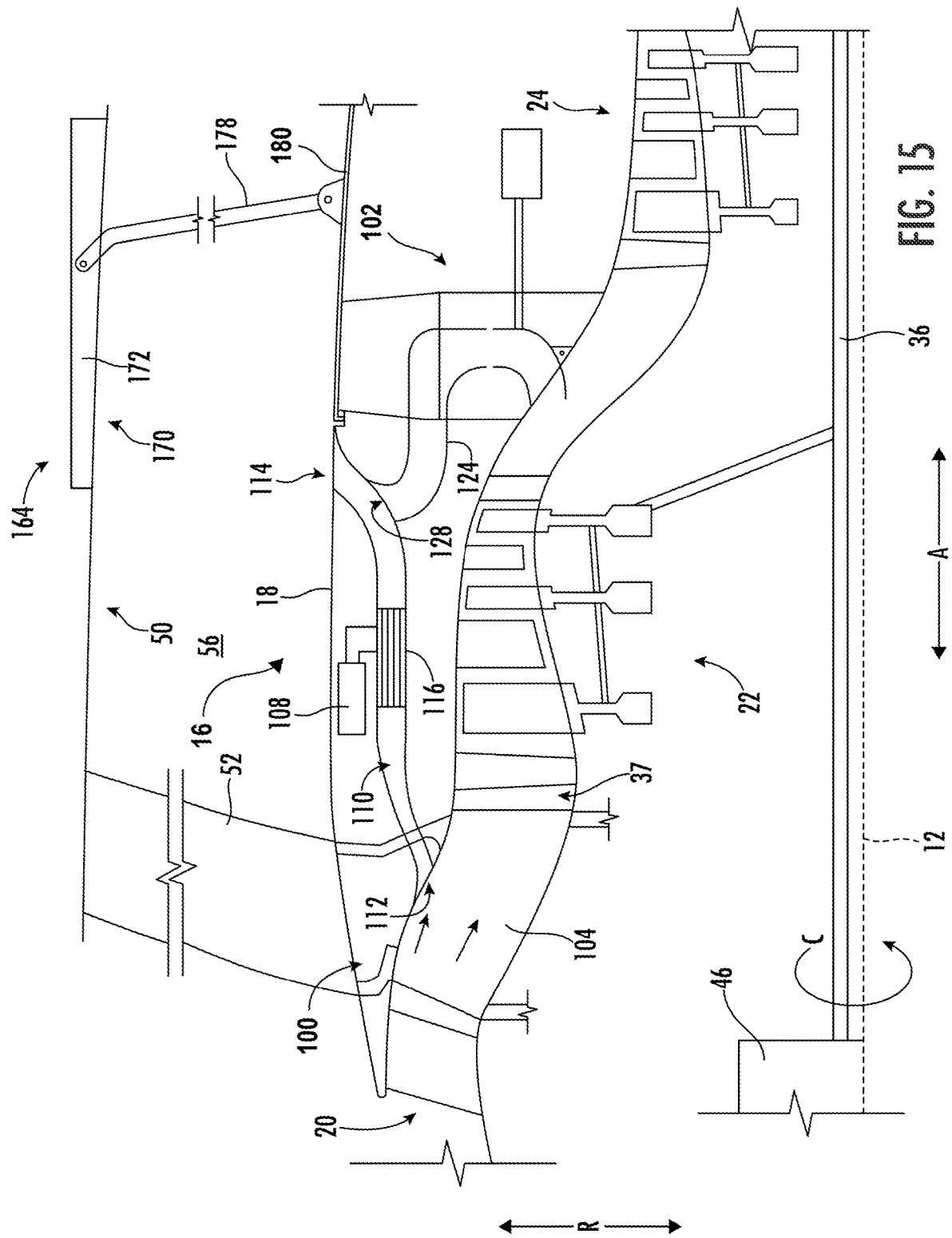
FIG. 15 is a schematic view of a portion of a turbomachine in accordance with another exemplary embodiment of the present disclosure.

For example, referring now to FIG. 15, a close-up, schematic view of a gas turbine engine 10 in accordance with another exemplary aspect of the present disclosure is provided. The exemplary gas turbine engine 10 depicted in FIG. 15 may be configured in a similar manner as exemplary gas turbine engine 10 described above with reference to FIGS. 12 and 13. The same or similar numbers may refer to the same or similar part.

For example, the exemplary gas turbine engine 10 depicted in FIG. 15 generally includes a gas turbine engine 10 having a turbomachine 16 and an outer nacelle 50, and defines a bypass passage 56 therebetween. The gas turbine engine 10 further includes a thrust reverser assembly 164 having an inner thrust reverser support 180 coupled to or formed integrally with the turbomachine 16 and including a forward interface 188 coupled to a forward member 184 of a compressor mid-frame 102 of the turbomachine 16. The inner thrust reverser support 180 includes a plurality of thrust reverser link attachments 182. The thrust reverser assembly 164 further includes a cascade assembly 170 having a plurality of cascade segments 172, and a plurality of drag links 178 extending from the cascade assembly 170 and attached to a plurality of thrust reverser link attachments 182 on the inner thrust reverser support 180.

Further, the exemplary turbomachine 16 generally includes a variable bleed assembly 122 having a variable bleed duct 124 extending between a VB inlet 126 and a VB outlet 128. However, for the embodiment of FIG. 15, the VB outlet 128 is not in airflow communication with the bypass passage 56 through the inner thrust reverser support 180. Instead, for the embodiment of FIG. 15, the turbomachine 16 defines a cooling passage 110 extending between a CP inlet 112 and a CP outlet 114. The CP inlet 112 is in airflow communication with a working gas flowpath 37 of the turbomachine 16 at a location upstream of a compressor section of the turbomachine 16, and the CP outlet 114 is in airflow communication with the bypass passage 56 of the gas turbine engine 10 defined between the outer nacelle 50 and the turbomachine 16. The VB outlet 128 is in airflow communication with the cooling passage 110. More specifically, for the embodiment shown, the variable bleed duct 124 of the variable bleed assembly 122 extends forward of the forward member 184 of the compressor mid-frame 102 to the cooling passage 110. In such a manner, it will be appreciated that the VB outlet 128 is in airflow communication with the bypass passage 56 through the cooling passage 110 and CP outlet 114 of the cooling passage 110, which is positioned at a location forward of the forward interface 188 of the thrust reverser support.

Moreover, it will be appreciated that although for the embodiments of FIGS. 11 through 15, an inner thrust reverser support 180 is depicted and described as being attached to the forward member 184 of the compressor mid-frame 102, in other embodiments, any other suitable hinged cowl assembly extending at least partially around a compressor section of a turbomachine may be provided, with the hinged cowl assembly including a forward interface coupled to the forward member of the compressor mid-frame.

Figure 14:
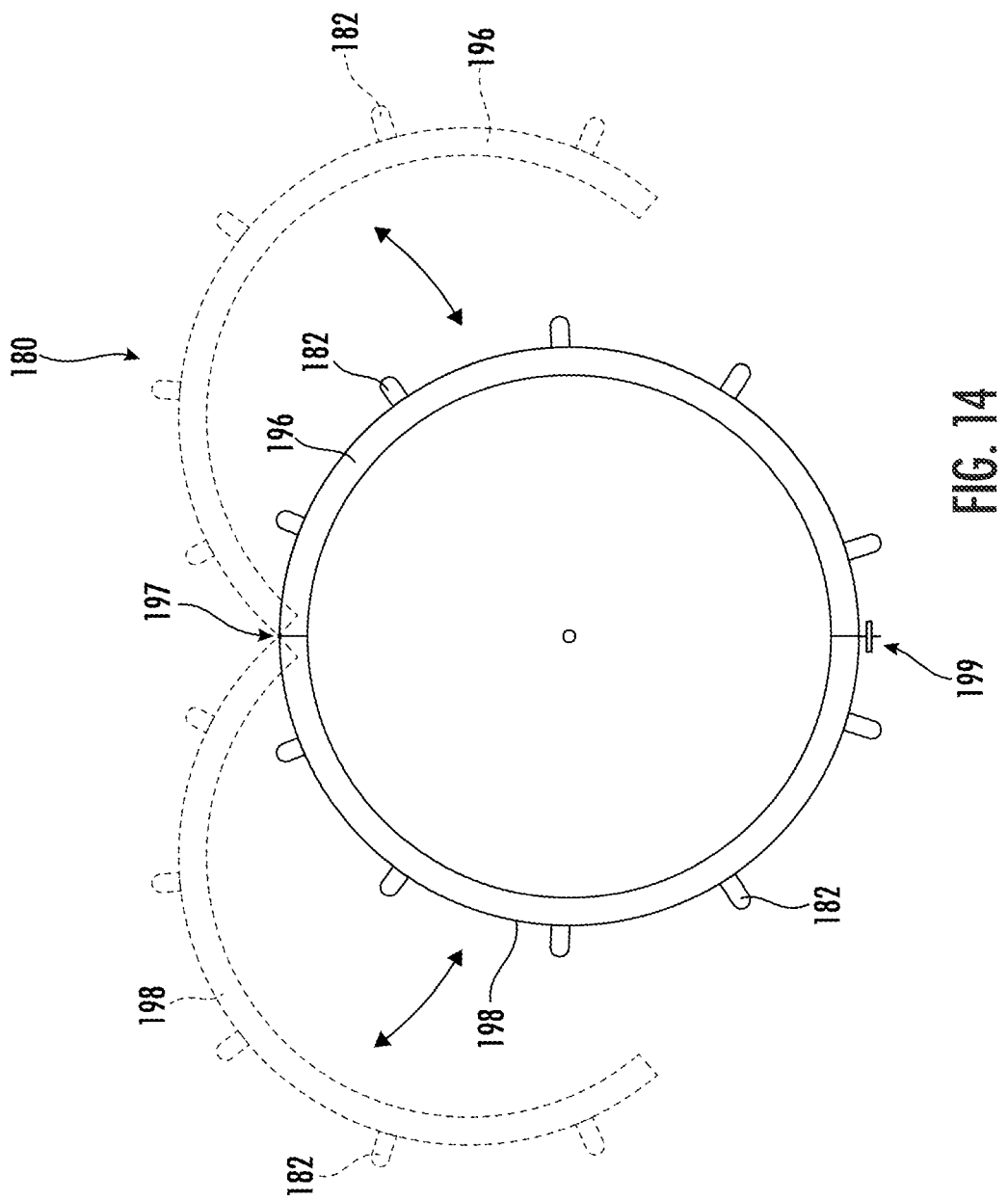
FIG. 14 is a schematic view of a hinged cowl assembly.

As with the embodiments described above, the hinged cowl assembly may include a first member and a second member, with the first member and the second member together extending substantially 360° when coupled together (similar to the embodiment depicted in FIG. 14). Further, the first member and the second member may together define a hinged connection (i.e., any mechanical connection that allows for the first member to pivot relative to the second member, such as a pinned connection) and a releasable mechanically connection (i.e., any mechanical connection that allows for a release without damaging the connection during a normal course, such as a bolted connection, a ratcheted connection, a latched connection, or the like).

It will be appreciated that inclusion of an inner thrust reverser support having a forward interface coupled to a forward member of a compressor mid-frame may allow for the inner thrust reverser support to be moved forward along an axial direction. Such may generally allow for more desirable aerodynamic lines of an outer casing encompassing turbomachinery of a turbomachine of the gas turbine engine, which may allow for a shorter and lighter gas turbine engine. In particular, when incorporated into a gas turbine engine including a reduction gearbox, such may allow for aerodynamic lines of the outer casing to more optimally define an outlet nozzle for a bypass passage in a shorter axial footprint, given a potential reduction in turbine stage enabled by inclusion of the reduction gearbox, allowing for the shorter and lighter gas turbine engine.

Further aspects are provided by the subject matter of the following clauses:

A gas turbine engine comprising: a fan assembly comprising a fan; and a turbomachine drivingly coupled to the fan and comprising a compressor section, a combustion section, and a turbine section arranged in serial flow order and defining in part a working gas flowpath, the gas turbine engine defining a bypass passage over the turbomachine; the turbomachine further comprising a heat exchanger and defining an annular cooling passage extending between an inlet and an outlet, the inlet in airflow communication with the working gas flowpath at a location upstream of the compressor section and the outlet in airflow communication with the bypass passage, the heat exchanger in thermal communication with an airflow through the cooling passage.

The gas turbine engine of any preceding clause, wherein the compressor section comprises a low pressure compressor and a high pressure compressor, and wherein the inlet is in airflow communication with the working gas flowpath at a location upstream of the low pressure compressor.

The gas turbine engine of any preceding clause, wherein the low pressure compressor is located downstream of the fan and is wherein no intermediate stages of compression are located between the fan and the low pressure compressor.

The gas turbine engine of any preceding clause, wherein the fan is a single stage fan.

The gas turbine engine of any preceding clause, further comprising: an outer nacelle surrounding the fan and at least a portion of the turbomachine, wherein the bypass passage is defined between the turbomachine and the outer nacelle.

The gas turbine engine of any preceding clause, wherein the turbomachine defines a turbomachine inlet to the working gas flowpath, wherein the turbomachine inlet is located immediately downstream of the fan, and wherein the fan is a single stage fan.

The gas turbine engine of any preceding clause, wherein the gas turbine engine defines an axial direction, and wherein the outlet is aligned with the compressor section along the axial direction.

The gas turbine engine of any preceding clause, wherein the gas turbine engine defines a circumferential direction, and wherein the heat exchanger is a first heat exchanger of a plurality of heat exchangers arranged along the circumferential direction within the annular cooling passage.

The gas turbine engine of any preceding clause, wherein the turbomachine comprises a compressor mid-frame, and wherein the outlet is in airflow communication with the bypass passage at a location forward of the compressor mid-frame.

The gas turbine engine of any preceding clause, wherein the gas turbine engine defines an axial direction, wherein the turbomachine comprises a compressor forward frame, and wherein the inlet is aligned with the compressor forward frame along the axial direction.

The gas turbine engine of any preceding clause, wherein the turbomachine includes a means for urging the airflow through the cooling passage.

The gas turbine engine of any preceding clause, wherein the turbomachine comprises an inlet scoop extending into the working gas flowpath to divert an airflow through the working gas flowpath and into the inlet of the cooling passage.

The gas turbine engine of any preceding clause, wherein the turbomachine comprises a hood extending over the outlet of the cooling passage, wherein the hood extends into the bypass passage to reduce a static pressure at the outlet of the cooling passage.

The gas turbine engine of any preceding clause, wherein the turbomachine comprises an ejector positioned in airflow communication with the cooling passage, wherein the ejector is in airflow communication with a high pressure air source.

The gas turbine engine of any preceding clause, wherein the turbomachine comprises a variable bleed assembly, and wherein the high pressure air source is the variable bleed assembly.

The gas turbine engine of any preceding clause, wherein during operating of the gas turbine engine at a first operating condition, the cooling passage is configured to receive between 2% and 20% of a total airflow through the working gas flowpath at a location upstream of the inlet.

The gas turbine engine of any preceding clause, wherein the first operating condition is a takeoff operating condition.

The gas turbine engine of any preceding clause, wherein during operating of the gas turbine engine at a first operating condition, the cooling passage is configured to receive between 4% and 12% of a total airflow through the working gas flowpath at a location upstream of the inlet.

The gas turbine engine of any preceding clause, wherein the gas turbine engine is a ducted turbofan engine.

The gas turbine engine of any preceding clause, further comprising: a reduction gearbox, wherein the turbomachine is drivingly coupled to the fan through the reduction gearbox.

A gas turbine engine comprising: a fan assembly comprising a fan; a turbomachine drivingly coupled to the fan and comprising a compressor section, a combustion section, and a turbine section arranged in serial flow order and defining in part a working gas flowpath, the gas turbine engine defining a bypass passage over the turbomachine, the turbomachine defining an annular cooling passage extending between a CP inlet and a CP outlet, the CP inlet in airflow communication with the working gas flowpath and the CP outlet in airflow communication with the bypass passage; and a variable bleed assembly comprising a variable bleed duct extending between a VB inlet and a VB outlet, the VB inlet in airflow communication with the working gas flowpath at a location downstream of the CP inlet and the VB outlet in airflow communication with the annular cooling passage for urging an airflow through the cooling passage.

The gas turbine engine of any preceding clause, wherein the compressor section comprises a compressor, wherein the CP inlet is in airflow communication with the working gas flowpath at a location upstream of the compressor, and wherein the VB inlet is in airflow communication with the working gas flowpath at a location downstream of the compressor.

The gas turbine engine of any preceding clause, wherein the compressor is a low pressure compressor.

The gas turbine engine of any preceding clause, wherein the compressor section further comprises a high pressure compressor, wherein the VB inlet is in airflow communication with the working gas flowpath at a location upstream of the high pressure compressor.

The gas turbine engine of any preceding clause, wherein the variable bleed assembly comprises a variable bleed valve for varying an amount of airflow through the variable bleed duct.

The gas turbine engine of any preceding clause, further comprising: a controller operably coupled to the variable bleed valve, wherein the controller is configured to actuate the variable bleed assembly to increase the amount of airflow through the variable bleed duct in response to an operating condition of the gas turbine engine to increase an amount of airflow through the annular cooling passage.

The gas turbine engine of any preceding clause, wherein the VB outlet forms at least in part an ejector.

The gas turbine engine of any preceding clause, wherein substantially all of an airflow through the variable bleed duct is provided through the VB outlet to the cooling passage.

The gas turbine engine of any preceding clause, wherein the VB outlet is a first VB outlet, and wherein the variable bleed duct further comprises a second VB outlet, wherein the second VB outlet is in direct airflow communication with the bypass passage.

The gas turbine engine of any preceding clause, wherein the turbomachine comprises a heat exchanger in thermal communication with the airflow through the cooling passage.

The gas turbine engine of any preceding clause, wherein the VB outlet is in airflow communication with the cooling passage at a location downstream of the heat exchanger.

The gas turbine engine of any preceding clause, wherein the gas turbine engine defines a circumferential direction, and wherein the heat exchanger is a first heat exchanger of a plurality of heat exchangers arranged along the circumferential direction within the annular cooling passage.

A method of operating a gas turbine engine comprising a fan assembly and a turbomachine drivingly coupled to a fan of the fan assembly, the method comprising: receiving data indicative of an operating condition of the gas turbine engine; and varying an amount of variable bleed airflow through a variable bleed duct provided to an annular cooling passage in response to the received data, the annular cooling passage extending between a CP inlet in airflow communication with a working gas flowpath of the turbomachine and a CP outlet in airflow communication with a bypass passage of the gas turbine engine.

The method of any preceding clause, wherein the operating condition is a low fan power operating condition, and wherein varying the amount of variable bleed airflow through the variable bleed duct provided to the annular cooling passage comprises increasing the amount of variable bleed airflow through the variable bleed duct provided to the annular cooling passage.

The method of any preceding clause, wherein the low fan power operating condition is a ground idle operating condition or a flight idle descent operating condition.

The method of any preceding clause, wherein the operating condition is indicative of an ambient temperature.

The method of any preceding clause, wherein the operating condition is indicative of the ambient temperature being greater than a threshold, and wherein varying the amount of variable bleed airflow through the variable bleed duct provided to the annular cooling passage comprises increasing the amount of variable bleed airflow through the variable bleed duct provided to the annular cooling passage.

The method of any preceding clause, wherein the variable bleed assembly comprises a variable bleed valve for varying an amount of airflow through the variable bleed duct.

The method of any preceding clause, wherein the turbomachine comprises a heat exchanger in thermal communication with an airflow through the cooling passage.

The method of any preceding clause, wherein the VB outlet is in airflow communication with the cooling passage at a location downstream of the heat exchanger.

A gas turbine engine comprising: a turbomachine, the gas turbine engine defining a bypass passage over the turbomachine, the turbomachine comprising: a compressor section having a first compressor and a second compressor and defining in part a working gas flowpath; and a compressor mid-frame extending through the working gas flowpath at a location between the first and second compressors, the compressor mid-frame comprising a forward member and an aft member; and a thrust reverser assembly comprising an inner thrust reverser support, the inner thrust reverser support comprising a forward interface coupled to the forward member of the compressor mid-frame.

The gas turbine engine of any preceding clause, wherein the inner thrust reverser support is annular and extends 360° around the turbomachine.

The gas turbine engine of any preceding clause, wherein the inner thrust reverser support is a two piece assembly.

The gas turbine engine of any preceding clause, wherein the forward interface comprises a radial member extending inwardly along the radial direction, wherein the forward member defines a circumferential groove, and wherein the radial member of the forward interface is positioned within the circumferential groove to couple the inner thrust reverser support to the compressor mid-frame.

The gas turbine engine of any preceding clause, wherein the gas turbine engine defines a circumferential direction, and wherein the inner thrust reverser support comprises a plurality of thrust reverser link attachments arranged along the circumferential direction of the gas turbine engine.

The gas turbine engine of any preceding clause, further comprising: a fan assembly comprising a fan, wherein the turbomachine is drivingly coupled to the fan; and an outer nacelle surrounding the fan and at least a portion of the turbomachine, wherein the bypass passage is defined between the turbomachine and the outer nacelle; wherein the thrust reverser assembly further comprises a cascade assembly having a plurality of drag links, wherein the drag links are attachable to the plurality of thrust reverser link attachments of the inner thrust reverser support.

The gas turbine engine of any preceding clause, wherein the turbomachine further comprises a variable bleed assembly comprising a variable bleed duct extending between a VB inlet and a VB outlet, the VB inlet in airflow communication with the working gas flowpath at a location aligned with the compressor mid-frame.

The gas turbine engine of any preceding clause, wherein the VB outlet is in airflow communication with the bypass passage at a location aft of the forward member of the compressor mid-frame.

The gas turbine engine of any preceding clause, wherein the VB outlet is in airflow communication with the bypass passage at a location forward of the aft member of the compressor mid-frame.

The gas turbine engine of any preceding clause, wherein the thrust reverser assembly comprises a seal positioned between the compressor mid-frame and the inner thrust reverser support.

The gas turbine engine of any preceding clause, wherein the VB outlet is in airflow communication with the bypass passage at a location forward of the forward interface of the thrust reverser support.

The gas turbine engine of any preceding clause, wherein the turbomachine further comprises a variable bleed assembly comprising a variable bleed duct, wherein the variable bleed duct of the variable bleed assembly extends forward of the forward member of the compressor mid-frame.

A gas turbine engine comprising: a turbomachine, the gas turbine engine defining a bypass passage over the turbomachine, the turbomachine comprising: a compressor section having a first compressor and a second compressor and defining in part a working gas flowpath; a compressor mid-frame extending through the working gas flowpath at a location between the first and second compressors, the compressor mid-frame comprising a forward member and an aft member; and a variable bleed assembly comprising a variable bleed duct extending between a VB inlet and an VB outlet, the VB inlet in airflow communication with the working gas flowpath at a location aligned with the compressor mid-frame, wherein the VB outlet is in airflow communication with the bypass passage at a location forward of the forward member of the compressor mid-frame, the variable bleed duct of the variable bleed assembly extending forward of the forward member of the compressor mid-frame to the VB outlet.

The gas turbine engine of any preceding clause, further comprising: a thrust reverser assembly comprising an inner thrust reverser support, the inner thrust reverser support comprising a forward interface coupled to the forward member of the compressor mid-frame.

The gas turbine engine of any preceding clause, wherein the VB outlet is in airflow communication with the bypass passage at a location forward of the forward interface of the inner thrust reverser support.

The gas turbine engine of any preceding clause, wherein the forward interface comprises a radial member extending inwardly along a radial direction of the gas turbine engine, wherein the forward member defines a circumferential groove, and wherein the radial member of the forward interface is positioned within the circumferential groove to couple the inner thrust reverser support to the compressor mid-frame.

The gas turbine engine of any preceding clause, wherein the gas turbine engine defines a circumferential direction, and wherein the inner thrust reverser support comprises a plurality of thrust reverser link attachments arranged along the circumferential direction of the gas turbine engine.

The gas turbine engine of any preceding clause, wherein the VB outlet is in airflow communication with the bypass passage at a location aft of the forward member of the compressor mid-frame.

The gas turbine engine of any preceding clause, wherein the VB outlet is in airflow communication with the bypass passage at a location forward of the aft member of the compressor mid-frame.

The gas turbine engine of any preceding clause, further comprising: a thrust reverser assembly comprising an inner thrust reverser support, the inner thrust reverser support comprising a forward interface coupled to the forward member of the compressor mid-frame, and wherein the thrust reverser assembly comprises an aerodynamic seal positioned between the compressor mid-frame and the inner thrust reverser support.

A gas turbine engine comprising: a turbomachine, the gas turbine engine defining a bypass passage over the turbomachine, the turbomachine comprising: a compressor section having a first compressor and a second compressor and defining in part a working gas flowpath; and a compressor mid-frame extending through the working gas flowpath at a location between the first and second compressors, the compressor mid-frame comprising a forward member and an aft member; and a hinged cowl assembly extending at least partially around the compressor section of the turbomachine, the hinged cowl assembly comprising a forward interface coupled to the forward member of the compressor mid-frame.

The gas turbine engine of any preceding clause, wherein hinged cowl assembly comprises a first member and a second member, wherein first member and the second member together extend substantially 360° when coupled together.

The gas turbine engine of any preceding clause, wherein the first member and the second member together define a hinged connection and a releasable mechanically connection.

The gas turbine engine of any preceding clause, wherein the hinged cowl assembly is an inner thrust reverser support of a thrust reverser assembly of the gas turbine engine.

The gas turbine engine of any preceding clause, wherein the forward interface comprises a radial member extending inwardly along the radial direction, wherein the forward member defines a circumferential groove, and wherein the radial member of the forward interface is positioned within the circumferential groove to couple the hinged cowl assembly to the compressor mid-frame.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine comprising:
   a fan assembly comprising a fan at a forward end of the gas turbine engine, the fan being a first stage of compression for the gas turbine engine; and
   a turbomachine drivingly coupled to the fan and comprising a compressor section, a combustion section, and a turbine section arranged in serial flow order and defining in part a working gas flowpath, the gas turbine engine defining a bypass passage over the turbomachine;
   the turbomachine further comprising a heat exchanger and defining an annular cooling passage extending between an inlet and an outlet, the inlet in airflow communication with the working gas flowpath at a location upstream of the compressor section and the outlet in airflow communication with the bypass passage, the heat exchanger in thermal communication with an airflow through the annular cooling passage, wherein the compressor section is located downstream of the fan, and wherein no intermediate stages of compression are located between the fan and the compressor section.

2. The gas turbine engine of claim 1, wherein the compressor section comprises a low pressure compressor and a high pressure compressor, and wherein the inlet is in airflow communication with the working gas flowpath at a location upstream of the low pressure compressor.

3. The gas turbine engine of claim 2, wherein the fan is a single stage fan.

4. The gas turbine engine of claim 1, further comprising:
   an outer nacelle surrounding the fan and at least a portion of the turbomachine, wherein the bypass passage is defined between the turbomachine and the outer nacelle.

5. The gas turbine engine of claim 1, wherein the turbomachine defines a turbomachine inlet to the working gas flowpath, wherein the turbomachine inlet is located immediately downstream of the fan, and wherein the fan is a single stage fan.

6. The gas turbine engine of claim 1, wherein the gas turbine engine defines an axial direction, and wherein the outlet is aligned with the compressor section along the axial direction.

7. The gas turbine engine of claim 1, wherein the gas turbine engine defines a circumferential direction, and wherein the heat exchanger is a first heat exchanger of a plurality of heat exchangers arranged along the circumferential direction within the annular cooling passage.

8. The gas turbine engine of claim 1, wherein the turbomachine comprises a compressor mid-frame, and wherein the outlet is in airflow communication with the bypass passage at a location forward of the compressor mid-frame.

9. The gas turbine engine of claim 8, wherein the gas turbine engine defines an axial direction, wherein the turbomachine comprises a compressor forward frame, and wherein the inlet is aligned with the compressor forward frame along the axial direction.

10. The gas turbine engine of claim 1, wherein the turbomachine includes a means for urging the airflow through the annular cooling passage.

11. The gas turbine engine of claim 1, wherein the turbomachine comprises an inlet scoop extending into the working gas flowpath to divert an airflow through the working gas flowpath and into the inlet of the annular cooling passage.

12. The gas turbine engine of claim 1, wherein the turbomachine comprises a hood extending over the outlet of the annular cooling passage, wherein the hood extends into the bypass passage to reduce a static pressure at the outlet of the annular cooling passage.

13. The gas turbine engine of claim 1, wherein the turbomachine comprises an ejector positioned in airflow communication with the cooling passage, wherein the ejector is in airflow communication with a high pressure air source.

14. The gas turbine engine of claim 13, wherein the turbomachine comprises a variable bleed assembly, and wherein the high pressure air source is the variable bleed assembly.

15. The gas turbine engine of claim 1, wherein during operating of the gas turbine engine at a first operating condition, the annular cooling passage is configured to receive between 2% and 20% of a total airflow through the working gas flowpath at a location upstream of the inlet.

16. The gas turbine engine of claim 15, wherein the first operating condition is a takeoff operating condition.

17. The gas turbine engine of claim 1, wherein during operating of the gas turbine engine at a first operating condition, the annular cooling passage is configured to receive between 4% and 12% of a total airflow through the working gas flowpath at a location upstream of the inlet.

18. The gas turbine engine of claim 1, wherein the gas turbine engine is a ducted turbofan engine.

19. The gas turbine engine of claim 1, further comprising:
   a reduction gearbox, wherein the turbomachine is drivingly coupled to the fan through the reduction gearbox.

* * * * *